(12) United States Patent
Liu et al.

(10) Patent No.: US 9,773,294 B2
(45) Date of Patent: Sep. 26, 2017

(54) GRAPHICS PROCESSING SYSTEM FOR DETERMINING WHETHER TO STORE VARYING VARIABLES INTO VARYING BUFFER BASED AT LEAST PARTLY ON PRIMITIVE SIZE AND RELATED GRAPHICS PROCESSING METHOD THEREOF

(71) Applicant: MEDIATEK INC., Hsin-Chu (TW)

(72) Inventors: Chun-Shen Liu, Taoyuan (TW);
Ming-Hao Liao, Hsinchu (TW);
Hung-Wei Wu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 161 days.

(21) Appl. No.: 14/680,081

(22) Filed: Apr. 7, 2015

(65) Prior Publication Data

US 2016/0005143 A1    Jan. 7, 2016

Related U.S. Application Data

(60) Provisional application No. 62/020,415, filed on Jul. 3, 2014.

(51) Int. Cl.
  *G06T 1/60* (2006.01)
  *G06T 15/00* (2011.01)
  *G06T 15/40* (2011.01)
(52) U.S. Cl.
  CPC .............. *G06T 1/60* (2013.01); *G06T 15/005* (2013.01); *G06T 15/40* (2013.01)

(58) Field of Classification Search
  None
  See application file for complete search history.

(56) References Cited

U.S. PATENT DOCUMENTS

| | | | | |
|---|---|---|---|---|
| 6,359,623 B1* | 3/2002 | Larson | .................. | G06T 15/405 345/421 |
| 7,928,989 B1* | 4/2011 | Brown | ................... | G06T 15/04 345/501 |
| 8,436,854 B2* | 5/2013 | Jiao | ......................... | G06T 1/20 345/421 |
| 2004/0212614 A1* | 10/2004 | Aila | ...................... | G06T 15/405 345/421 |
| 2006/0209078 A1* | 9/2006 | Anderson | ............. | G06T 15/005 345/506 |
| 2010/0007662 A1* | 1/2010 | Cox | ........................ | G06T 15/40 345/420 |
| 2011/0267346 A1* | 11/2011 | Howson | ................ | G06T 15/005 345/423 |
| 2012/0223947 A1* | 9/2012 | Nystad | .................. | G06T 15/005 345/426 |
| 2014/0267256 A1* | 9/2014 | Heggelund | ............. | G06T 15/40 345/421 |

(Continued)

*Primary Examiner* — Yu Chen
(74) *Attorney, Agent, or Firm* — Winston Hsu; Scott Margo

(57) ABSTRACT

A graphics processing system includes a decision logic and a varying buffer control circuit. The decision logic sets a control signal by checking at least one criterion, wherein the at least one criterion includes a first criterion, and a checking result of the first criterion depends on a size of a primitive. The varying buffer control circuit refers to the control signal to determine whether to store varying variables of the primitive into a varying buffer.

24 Claims, 18 Drawing Sheets

(56) References Cited

U.S. PATENT DOCUMENTS

2014/0354640 A1* 12/2014 Nystad .................... G06T 15/40
                                                    345/421
2014/0354682 A1* 12/2014 Heggelund ............... G06T 1/20
                                                    345/619
2015/0109313 A1*  4/2015 Heggelund ........... G06T 15/005
                                                    345/522
2015/0325037 A1* 11/2015 Lentz ...................... G06T 15/10
                                                    345/419

* cited by examiner

GRAPHICS PROCESSING SYSTEM FOR DETERMINING WHETHER TO STORE VARYING VARIABLES INTO VARYING BUFFER BASED AT LEAST PARTLY ON PRIMITIVE SIZE AND RELATED GRAPHICS PROCESSING METHOD THEREOF

CROSS REFERENCE TO RELATED APPLICATIONS

This application claims the benefit of U.S. provisional application No. 62/020,415, filed on Jul. 3, 2014 and incorporated herein by reference.

BACKGROUND

The present invention relates to graphics processing, and more particularly, to a graphics processing system for determining whether to store varying variables based at least partly on a primitive size and a related graphics processing method thereof.

As known in the art, graphics processing is typically carried out in a pipelined fashion, with multiple pipeline stages operating on the data to generate the final rendering output (e.g., a frame that is displayed). Many graphics processing pipelines now include one or more programmable processing stages, commonly referred to as "shaders", which execute programs to perform graphics processing operations to generate the desired graphics data. For example, the graphics processing pipeline may include a vertex shader and a pixel (fragment) shader. These shaders are programmable processing stages that may execute shader programs on input data values to generate a desired set of output data for being further processing by the rest of the graphics pipeline stages. The shaders of the graphics processing pipeline may share programmable processing circuitry, or may be distinct programmable processing units.

In addition to the vertex shader and the pixel shader, pre-depth (Pre-Z) processing is a feature supported by many graphics processing units (GPUs). The Pre-Z processing stage is placed before a pixel shading stage in the pipeline. For example, if the Pre-Z processing stage decides that a primitive is behind a geometry (i.e., the primitive in a screen space is invisible), the primitive can be discarded such that following processing of the primitive can be omitted to save the system resource. How to properly remove primitives according to Pre-Z test results has become an issue for designers in the pertinent field.

SUMMARY

One of the objectives of the claimed invention is to provide a graphics processing system for determining whether to store varying variables based at least partly on a primitive size and a related graphics processing method thereof.

According to a first aspect of the present invention, an exemplary graphics processing system includes a decision logic and a varying buffer control circuit. The decision logic is configured to set a control signal by checking at least one criterion, wherein the at least one criterion includes a first criterion, and a checking result of the first criterion depends on a size of a primitive. The varying buffer control circuit is configured to refer to the control signal to determine whether to store varying variables of the primitive into a varying buffer.

According to a second aspect of the present invention, an exemplary graphics processing method is disclosed. The exemplary graphics processing method includes: utilizing a decision logic for setting a control signal by checking at least one criterion, wherein the at least one criterion includes a first criterion, and a checking result of the first criterion depends on a size of a primitive; and referring to the control signal to determine whether to store varying variables of the primitive into a varying buffer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to adaptively switch between two modes of the Pre-Z test according to the primitive size. When a first mode of the Pre-Z test is enabled, a primitive can be removed before data of the primitive is written into a tile buffer. However, all of the varying variables of the primitive are still written into a varying buffer in the vertex pass (VP). Hence, there is no saving of VP varying write. When a second mode of the Pre-Z test is enabled, a primitive can be removed before data of the primitive is written into a tile buffer and a varying buffer. However, when the primitive is large, writing varying variables of the primitive into the varying buffer may be stalled due to the long latency of the Pre-Z test of the primitive. A graphics processing system using the proposed adaptive Pre-Z occlusion design can avoid disadvantages of both modes to thereby benefit from both modes. Further details of the proposed adaptive Pre-Z occlusion design are described as below.

Figure 1:
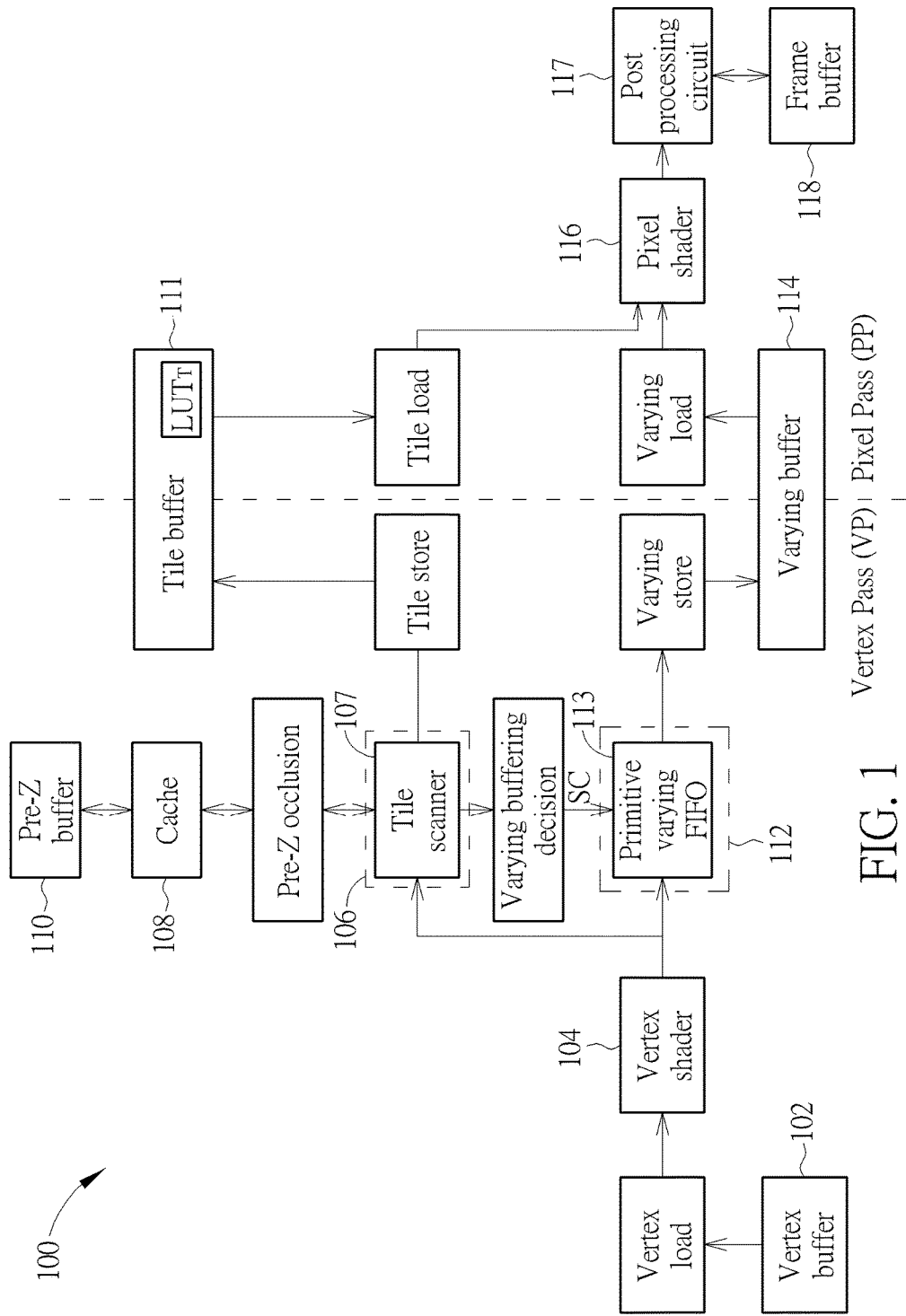
FIG. 1 is a diagram illustrating a graphics processing system according to an embodiment of the present invention.

FIG. 1 is a diagram illustrating a graphics processing system according to an embodiment of the present invention. By way of example, but not limitation, the graphics processing system 100 may be a tile-based rendering (TBR) system. As shown in FIG. 1, the graphics processing system 100 includes a vertex buffer 102, a vertex shader 104, a decision logic 106 (e.g., a tile scanner 107), a cache 108, a pre-depth (Pre-Z) buffer 110, a tile buffer 111, a varying buffer control circuit 112 (e.g., a primitive varying first-in first-out (FIFO) buffer 113), a varying buffer 114, a pixel shader 116, a post processing circuit 117, and a frame buffer 118. With regard to the vertex pass (VP), vertex data of primitives in the vertex buffer 102 are loaded into the vertex shader 104 to undergo vertex shading. The tile scanner 107 divides a screen space into a plurality of tiles. Concerning each primitive processed by the preceding vertex shader 104 and required to be processed by the following pixel shader 116, the tile scanner 107 checks distribution of the primitive in the screen space to find out tile(s) covered by the primitive, and stores primitive information of the primitive into a tile table $LUT_T$ in the tile buffer 111. It is noted that the cache 108 could be optional in some embodiments.

Figure 2:
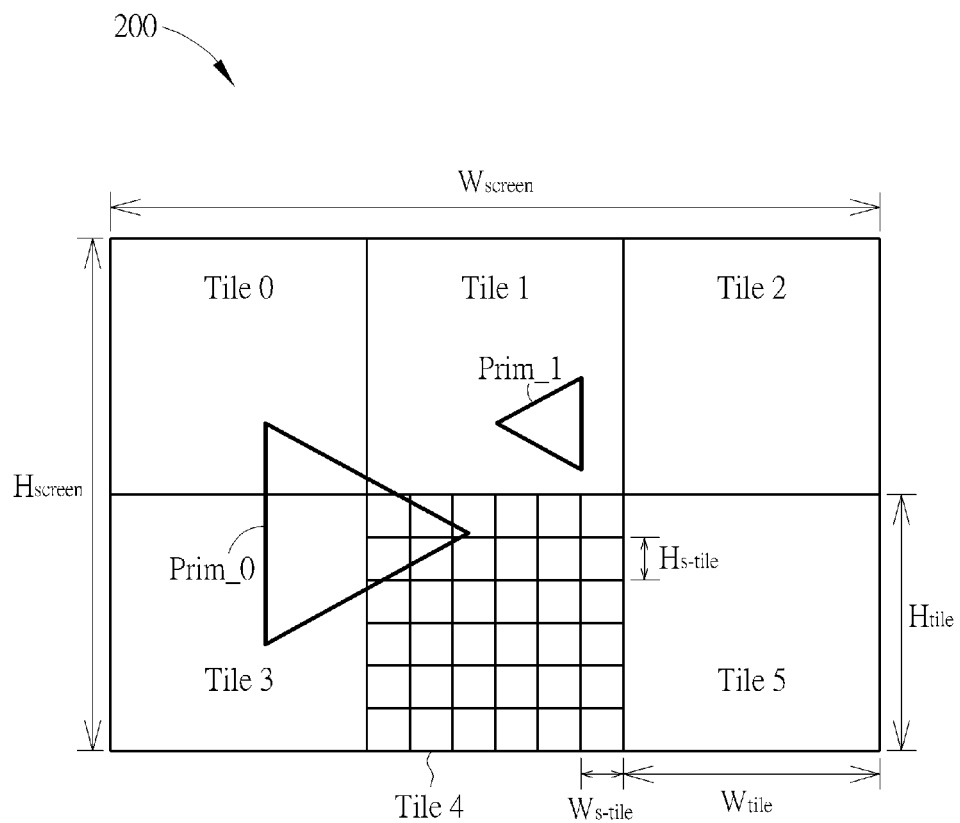
FIG. 2 is a diagram illustrating an example of a screen space divided into a plurality of tiles.

FIG. 2 is a diagram illustrating an example of a screen space divided into a plurality of tiles. In this example, the screen space 200 with width $W_{screen}$ and height $H_{screen}$ is divided into six tiles, Tile 0, Tile 1, Tile 2, Tile 3, Tile 4, and Tile 5, and each has width $W_{tile}$ and height $H_{tile}$. It should be noted that the screen space size and the tile size are for illustrative purposes only, and are not meant to be limitations of the present invention. In this example, there are two primitives Prim_0 and Prim_1 in the screen space 200, where four tiles (Tile 0, Tile 1, Tile 3, and Tile 4) are covered by the primitive Prim_0, and only one tile, Tile 1, is covered by the primitive Prim_1. Hence, the tile scanner 107 stores corresponding primitive information into the tile buffer 111 according to the distribution of primitives Prim_0 and Prim_1 in the screen space 200.

Figure 3:
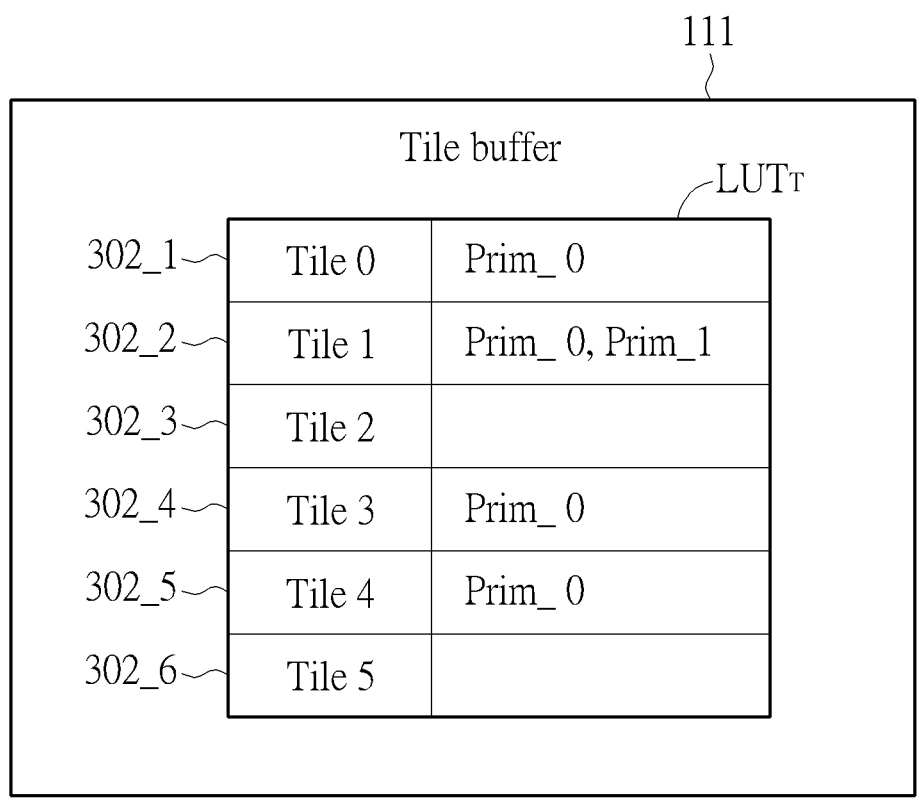
FIG. 3 is a diagram illustrating an example of a tile table stored in a tile buffer shown in FIG. 1.

FIG. 3 is a diagram illustrating an example of the tile table $LUT_T$ stored in the tile buffer 111 shown in FIG. 1. In a case where the screen space 200 is divided into 6 tiles (Tile 0-Tile 5), the tile table $LUT_T$ may be configured to have 6 table entries 302_1-302_6 corresponding to tiles of Tile 0-Tile 5, respectively. Since four tiles, Tile 0, Tile 1, Tile 3, and Tile 4, are covered by the primitive Prim_0, primitive information of the primitive Prim_0 in the Tile 0 is stored into the table entry 302_1, primitive information of the primitive Prim_0 in the Tile 1 is stored into the table entry 302_2, primitive information of the primitive Prim_0 in the Tile 3 is stored into the table entry 302_4, and primitive information of the primitive Prim_0 in the Tile 4 is stored into the table entry 302_5. Similarly, since the Tile 1 is covered by the primitive Prim_1, primitive information of the primitive Prim_1 in the Tile 1 is stored into the table entry 302_2.

Varying variables provide an interface between the vertex shader 104 and the pixel shader 116. In general, the vertex shader 104 computes values per vertex, and pixel shader 116 computes values per pixel. If a varying variable is defined in the vertex shader 104, its value will be interpolated over the primitive being rendered. Hence, an interpolated value can be accessed by the pixel shader 116. Concerning each primitive processed by the preceding vertex shader 104, associated varying variables may be stored into the varying buffer 114. Due to tile-based rendering, the pixel shader 116 is used to process tiles in the screen space one by one. For each of the tiles processed in the pixel pass (PP), the pixel shader 116 loads primitive information of the tile from the tile buffer 111, loads associated varying variables from the varying buffer 114, and generates a pixel shading result of the tile (i.e., a pixel shading result of a sub-primitive in the tile) to the post processing circuit 117 based on the loaded primitive information and loaded varying variables. A frame to be displayed is generated from the post processing circuit 117 to the frame buffer 118. For example, color blending is performed in the post processing circuit 117.

In this embodiment, the decision logic 107 (e.g., tile scanner 107) is further configured to perform a Pre-Z occlusion operation (e.g., Pre-Z test) for each primitive and make a varying buffering decision for varying variables of each primitive. In addition, the screen space is divided into a plurality of sub-regions (i.e., small-sized regions) for doing the Pre-Z occlusion operation and the varying buffering decision making operation. In a case where the tile-based rendering is employed, each tile in the screen space is further divided into a plurality of sub-regions (or called sub-tiles). Please refer to FIG. 2 again. The tile scanner 107 may further divide each of the tiles Tile 0-Tile 5 into sub-regions (sub-tiles) each having width $W_{s\text{-}tile}$ and height $H_{s\text{-}tile}$. It should be noted that the sub-region size shown in FIG. 2 is also for illustrative purposes only, and is not meant to be a limitation of the present invention.

The decision logic 106 (e.g., tile scanner 107) makes a varying buffering decision for each primitive, and accordingly generates a control signal SC to the varying buffer control circuit 112 (e.g., primitive varying FIFO buffer 113). The varying buffer control circuit 112 (e.g., primitive varying FIFO buffer 113) refers to the control signal SC to determine whether to store varying variables of a primitive into the varying buffer 114. In this embodiment, the tile scanner 107 sets the control signal SC by checking at least one criterion, where the at least one criterion includes a first criterion, and a checking result of the first criterion depends on the primitive size. When determining that storing varying variables of the primitive into the varying buffer 114 is not allowed by the checking result of the first criterion, the tile scanner 107 further checks at least one second criterion different from the first criterion, where a checking result of each second criterion depends on Pre-Z test performed upon the primitive. Specifically, the first criterion is a primitive size based criterion, and each second criterion is a Pre-Z test based criterion.

Figure 4:
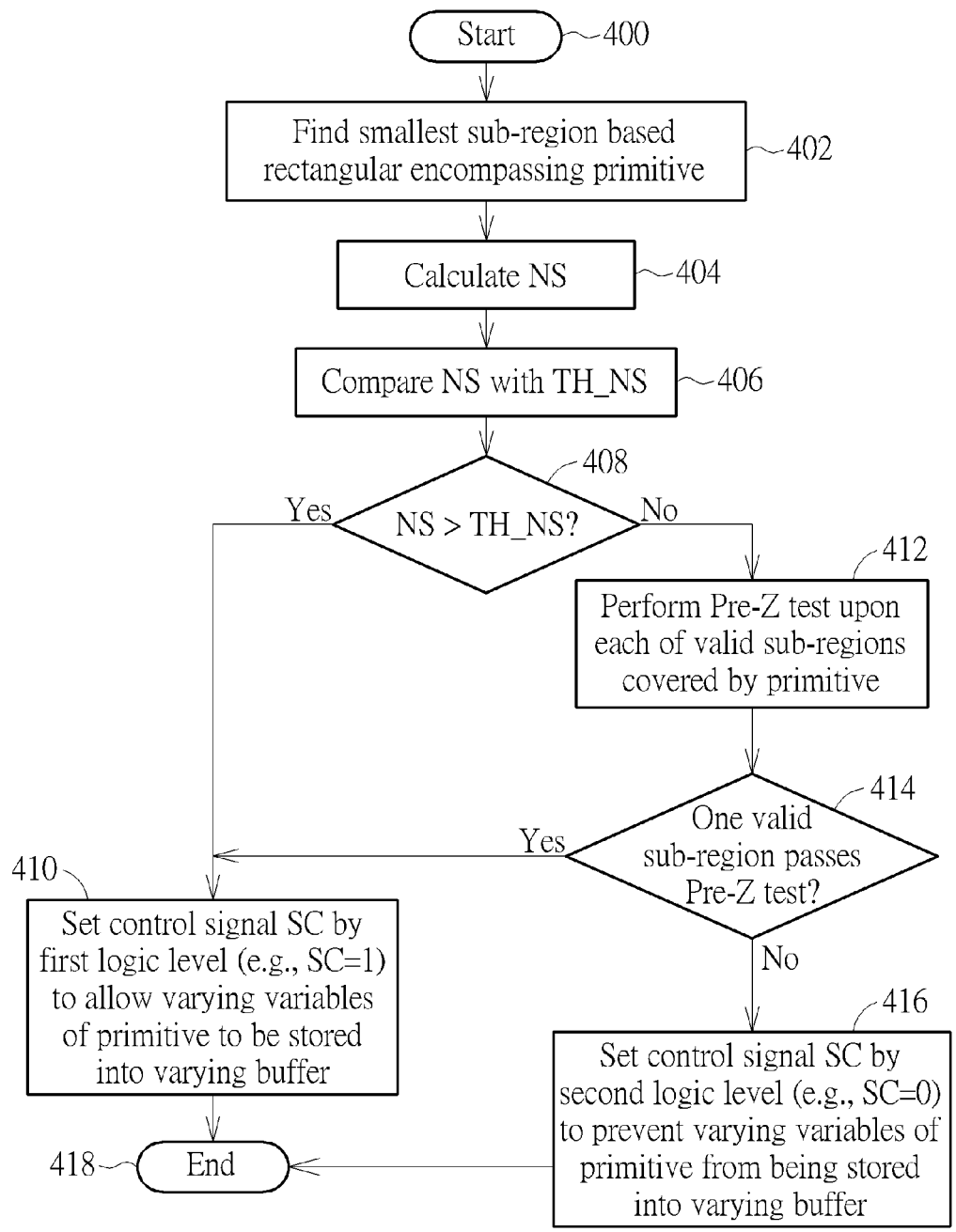
FIG. 4 is a diagram illustrating a method for setting a control signal according to a first embodiment of the present invention.

FIG. 4 is a diagram illustrating a method for setting the control signal SC according to a first embodiment of the present invention. Provided that the result is substantially the same, the steps are not required to be executed in the exact order shown in FIG. 4. The method may be employed by the tile scanner 107, and may be briefly summarized as below.

Step 400: Start.

Step 402: Find a smallest sub-region based rectangular encompassing a primitive.

Step 404: Calculate the number NS of valid sub-regions covered by the smallest sub-region based rectangular to estimate a size of the primitive.

Step 406: Compare the number NS of valid sub-regions covered by the smallest sub-region based rectangular with a predetermined threshold TH_NS.

Step 408: Check if the number NS of valid sub-regions covered by the smallest sub-region based rectangular is larger than the predetermined threshold TH_NS. If yes, go to step 410; otherwise, go to step 412.

Step 410: Set the control signal SC by a first logic level to allow varying variables of the primitive to be stored into the varying buffer 114. Go to step 418.

Step 412: Perform a Pre-Z test upon each of valid sub-regions covered by the primitive.

Step 414: Check if one of the valid sub-regions covered by the primitive passes the Pre-Z test. If yes, go to step 410; otherwise, go to step 416.

Step 416: Set the control signal SC by a second logic level to prevent varying variables of the primitive from being stored into the varying buffer 114.

Step 418: End.

Figure 5:
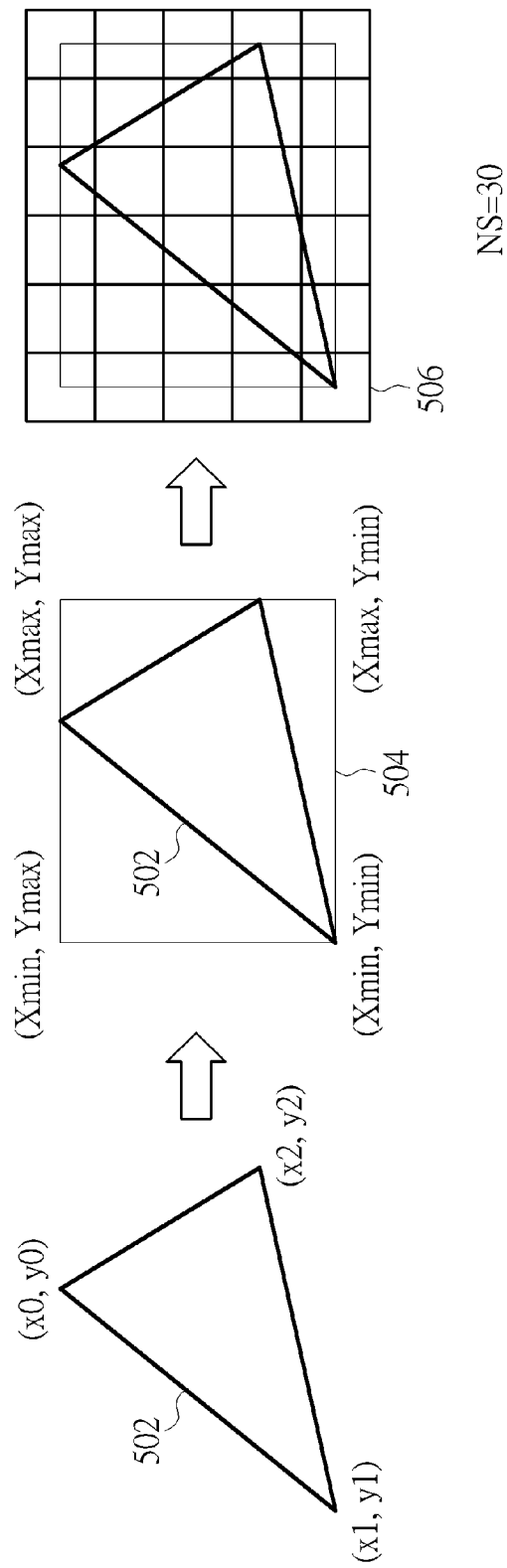
FIG. 5 is a diagram illustrating an operation of performing size estimation for a primitive according to an embodiment of the present invention.

The tile scanner 107 estimates a size of a primitive through using a smallest sub-region based rectangular that encompasses the primitive (steps 402 and 404). FIG. 5 is a diagram illustrating an operation of performing size estimation for a primitive according to an embodiment of the present invention. In this example, a primitive 502 has three vertices located at (x0, y0), (x1, y1), and (x2, y2). The tile scanner 107 can find locations of four vertexes of the smallest sub-region based rectangular by using following formulas.

$$X\text{min} = \min(x0, x1, x2) \quad (1)$$

$$X\text{max} = \max(x0, x1, x2) \quad (2)$$

$$Y\text{min} = \min(y0, y1, y2) \quad (3)$$

$$Y\text{max} = \max(y0, y1, y2) \quad (4)$$

Hence, the tile scanner 107 determines the smallest sub-region based rectangular 504 based on the four vertices located at (Xmin, Ymax), (Xmax, Ymax), (Xmin, Ymin), and (Xmax, Ymin). The tile scanner 107 calculates the number NS of valid sub-regions 506 covered by the smallest sub-region based rectangular 504 to estimate the size of the primitive 502. For example, the tile scanner 107 can determine the value of NS by using following formulas.

$$IDX\text{min} = \frac{X\text{min}}{W_{s-tile}} \quad (5)$$

$$IDX\text{max} = \text{ceiling}\left(\frac{X\text{max}}{W_{s-tile}}\right) \quad (6)$$

$$IDY\text{min} = \frac{Y\text{min}}{H_{s-tile}} \quad (7)$$

$$IDY\text{max} = \text{ceiling}\left(\frac{Y\text{max}}{H_{s-tile}}\right) \quad (8)$$

$$NS = (IDX\text{max} - IDX\text{min}) \times (IDY\text{max} - IDY\text{min}) \quad (9)$$

As shown in FIG. 5, there are 30 valid sub-regions 506 covered by the smallest sub-region based rectangular 504. The value of NS is set by 30.

Next, the tile scanner 107 checks if a first criterion (i.e., a primitive size based criterion) is met by comparing the number NS of valid sub-regions 506 covered by the smallest sub-region based rectangular 504 with a predetermined threshold TH_NS. The predetermined threshold TH_NS may be set based on the tile scanner/Pre-Z throughput. When NS>TH_NS, it means that the Pre-Z test performed upon the primitive 502 would take a long time. Hence, when the checking result of the first criterion indicates that NS>TH_NS, the tile scanner 107 is configured to set the control signal SC by the first logic level (e.g., "1") for allowing the primitive varying FIFO buffer 113 to output varying variables of the primitive 502 to the varying buffer 114 (step 410). Since all of the varying variables of the primitive 502 are stored into the varying buffer 114 before completion of the Pre-Z test performed upon the primitive 502, the graphics processing system 100 may be regarded as having the first mode of Pre-Z test enabled for controlling keeping/dropping of the primitive before data of the primitive is written into the tile buffer 111. In this way, storing varying variables of the primitive 502 into the varying buffer 114 may not be significantly stalled by the long latency caused by the Pre-Z test performed upon the primitive 502.

However, when the checking result of the first criterion indicates that NS≤TH_NS, the graphics processing system 100 may be regarded as switching from the first mode of Pre-Z test to the second mode of Pre-Z test, where the second mode of Pre-Z test is enabled for controlling keeping or dropping of the primitive before data of the primitive is written into the tile buffer 111 and the varying buffer 114. Since storing varying variables of the primitive 502 into the varying buffer 114 is controlled by Pre-Z test performed upon the primitive 502, it is possible that the varying variables of the primitive 502 are not allowed to be stored into the varying buffer 114. In this embodiment, the result of the Pre-Z occlusion operation is referenced for doing the varying buffering decision making operation (Step 412). In other words, step 412 may be shared between the Pre-Z occlusion operation and the varying buffering decision making operation. In this embodiment, Pre-Z test results of valid sub-regions (valid sub-tiles) covered by a primitive are used by either of Pre-Z occlusion operation and varying buffering decision making operation of the primitive.

Figure 6:
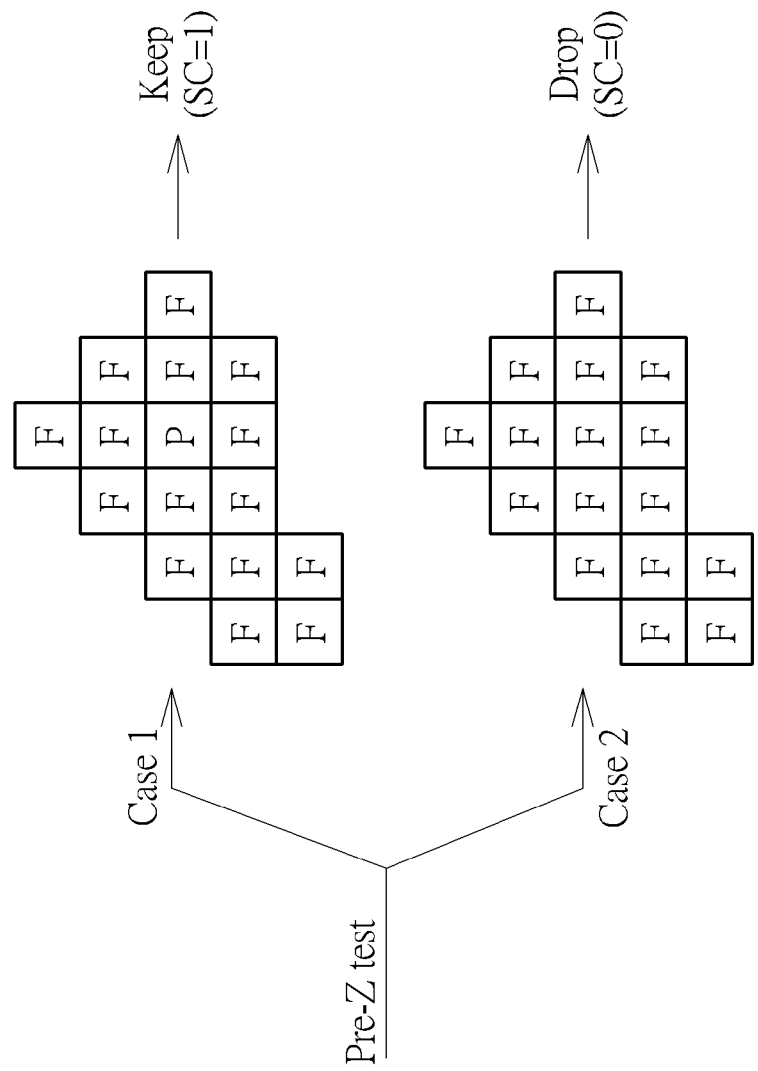
FIG. 6 is a diagram illustrating a first example of making a varying buffering decision based on a Pre-Z test of a primitive.
Figure 6:
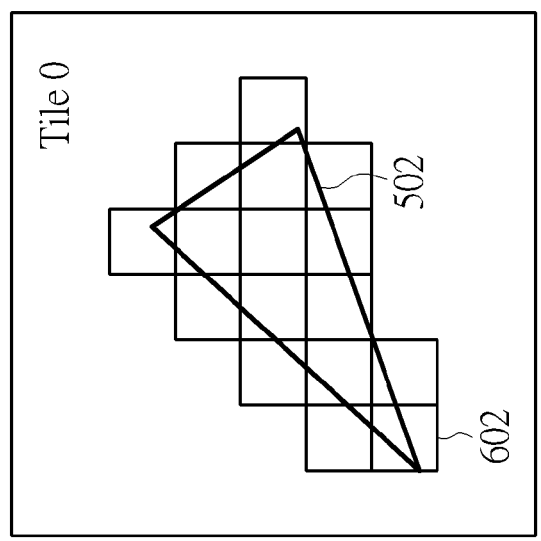

In step 412, the tile scanner 107 identifies valid sub-regions covered by the primitive, and perform Pre-Z test upon each of the valid sub-regions. With regard to varying buffering decision making, FIG. 6 is a diagram illustrating a first example of making a varying buffering decision based on a Pre-Z test of a primitive. The tile scanner 107 identifies valid sub-regions 602 covered by the primitive 502, where the valid sub-regions 602 are distributed in the same tile (e.g., Tile 0). In addition, the tile scanner 107 performs a Pre-Z test upon each of the valid sub-regions 602 to generate a Pre-Z test result being either "PASS (denoted by P)" or "FAIL (denoted by F)", where reference depth information needed by the Pre-Z test preformed upon each of the valid sub-regions 602 is read from the Pre-Z buffer 110 or the cache 108. When at least one of the valid sub-regions 602 passes the Pre-Z test, the tile scanner 107 is configured to set the control signal SC by the first logic level (e.g., "1") for allowing the primitive varying FIFO buffer 113 to output varying variables of the primitive 502 to the varying buffer 114 (step 410), as illustrated by the first case in FIG. 6. However, when none of the valid sub-regions 602 passes the Pre-Z test, the tile scanner 107 is configured to set the control signal SC by the second logic level (e.g., "0") for preventing the primitive varying FIFO buffer 113 from outputting varying variables of the primitive 502 to the varying buffer 114 (step 416), as illustrated by the second case in FIG. 6.

Figure 7:
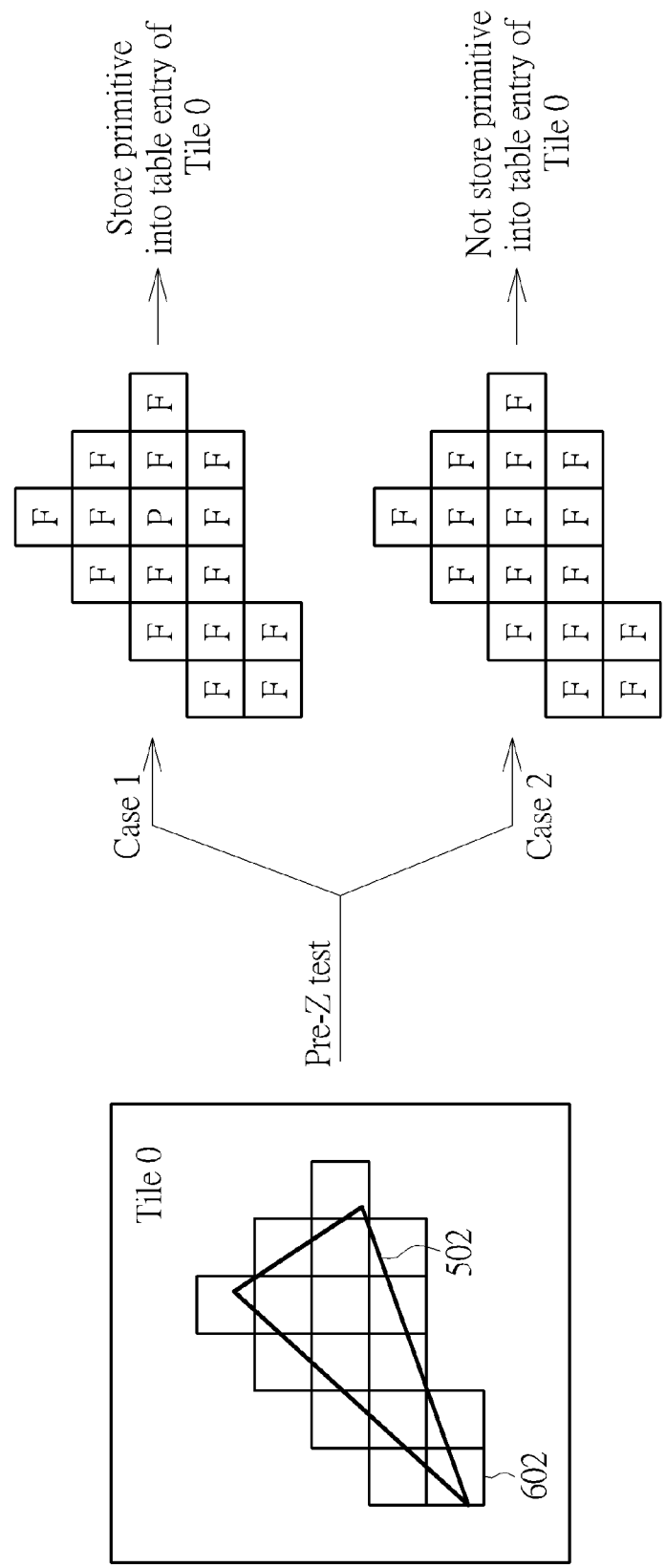
FIG. 7 is a diagram illustrating a first example of selectively removing a primitive based on Pre-Z test of the primitive.

As mentioned above, step 412 may be shared between the Pre-Z occlusion operation and the varying buffering decision making operation. With regard to the Pre-Z occlusion operation, FIG. 7 is a diagram illustrating a first example of selectively removing a primitive based on Pre-Z test of the primitive. In this example, the valid sub-regions 602 covered by the primitive 502 are distributed in the same tile (e.g., Tile 0). When at least one of the valid sub-regions 602 passes the Pre-Z test, meaning that the primitive 502 is not behind a geometry (i.e., the primitive 502 is visible in the screen space), the tile scanner 107 is configured to store primitive information of the primitive 502 into the tile table 111 (e.g., table entry 302_1 shown in FIG. 3), as illustrated by the first case in FIG. 7. However, when none of the valid sub-regions 602 passes the Pre-Z test, meaning that the primitive 502 is behind a geometry (i.e., the primitive 502 is invisible in the screen space), the tile scanner 107 is configured not to store primitive information of the primitive 502 into the tile table 111 (e.g., table entry 302_1 shown in FIG. 3), as illustrated by the second case in FIG. 7.

Figure 8:
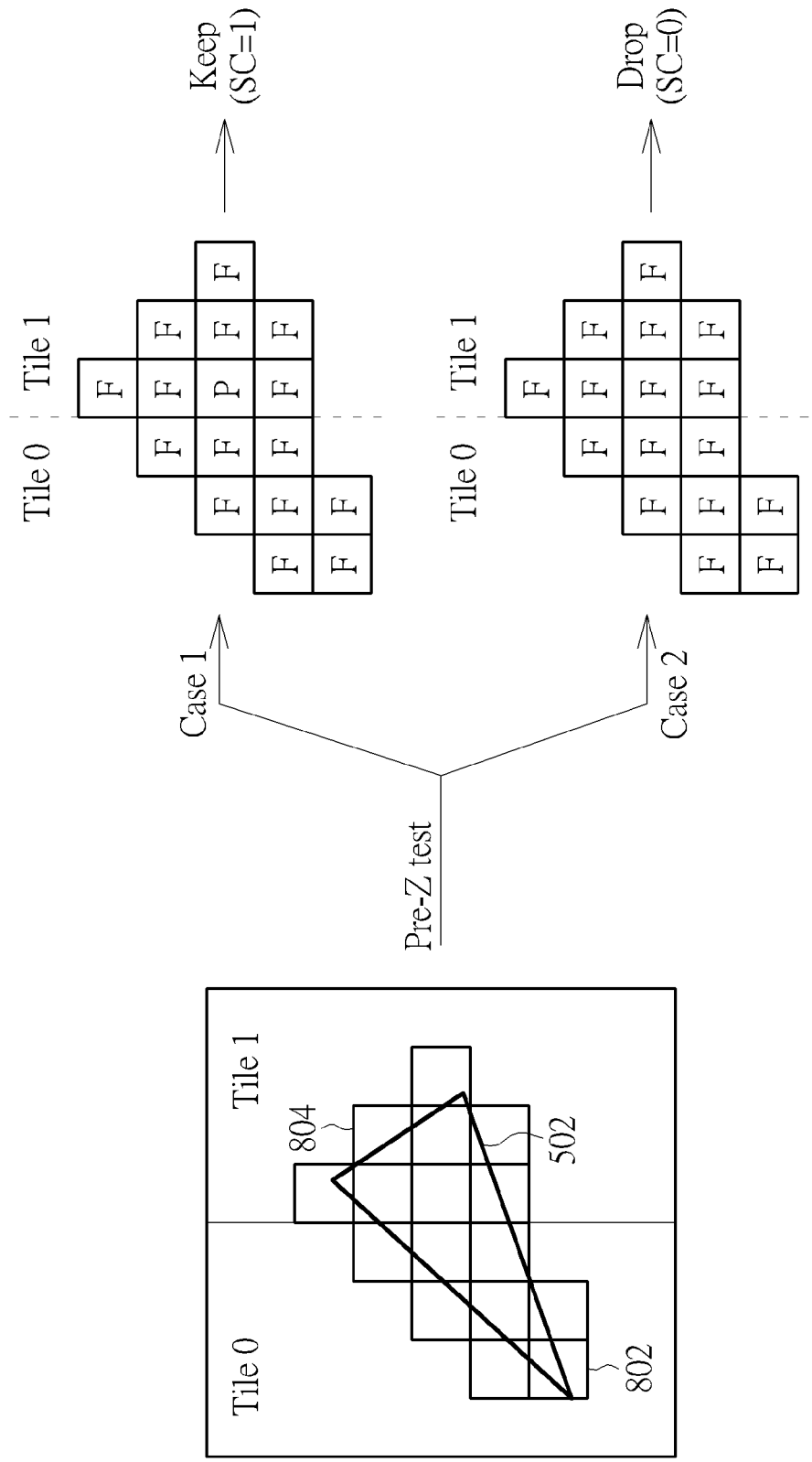
FIG. 8 is a diagram illustrating a second example of making a varying buffering decision based on a Pre-Z test of a primitive.

In above examples, the primitive is within a single tile only. However, it is possible that one portion of the primitive is within one tile, and another portion of the primitive is within another tile. With regard to varying buffering decision making, FIG. 8 is a diagram illustrating a second example of making a varying buffering decision based on a Pre-Z test of a primitive. The tile scanner 107 identifies valid sub-regions 802 and 804 covered by the primitive 502. The valid sub-regions 802 and 804 are distributed in different tiles (e.g., Tile 0 and Tile 1), respectively. More specifically, valid sub-regions 802 are distributed in one tile Tile 0 only, and valid sub-regions 804 are distributed in another tile Tile 1 only. In addition, the tile scanner 107 performs a Pre-Z test upon each of the valid sub-regions 802 and 804 to generate a Pre-Z test result being either "PASS (denoted by P)" or "FAIL (denoted by F)", where reference depth information needed by the Pre-Z test preformed upon each of the valid sub-regions 802 and 804 is read from the Pre-Z buffer 110 or the cache 108. When at least one of the valid sub-regions 802 and 804 passes the Pre-Z test, the tile scanner 107 is configured to set the control signal SC by the first logic level (e.g., "1") for allowing the primitive varying FIFO buffer 113 to output varying variables of the primitive 502 to the varying buffer 114 (step 410), as illustrated by the first case in FIG. 8. However, when none of the valid sub-regions 802 and 804 passes the Pre-Z test, the tile scanner 107 is configured to set the control signal SC by the second logic level (e.g., "0") for preventing the primitive varying FIFO buffer 113 from outputting varying variables of the primitive 502 to the varying buffer 114 (step 416), as illustrated by the second case in FIG. 8.

Figure 9:
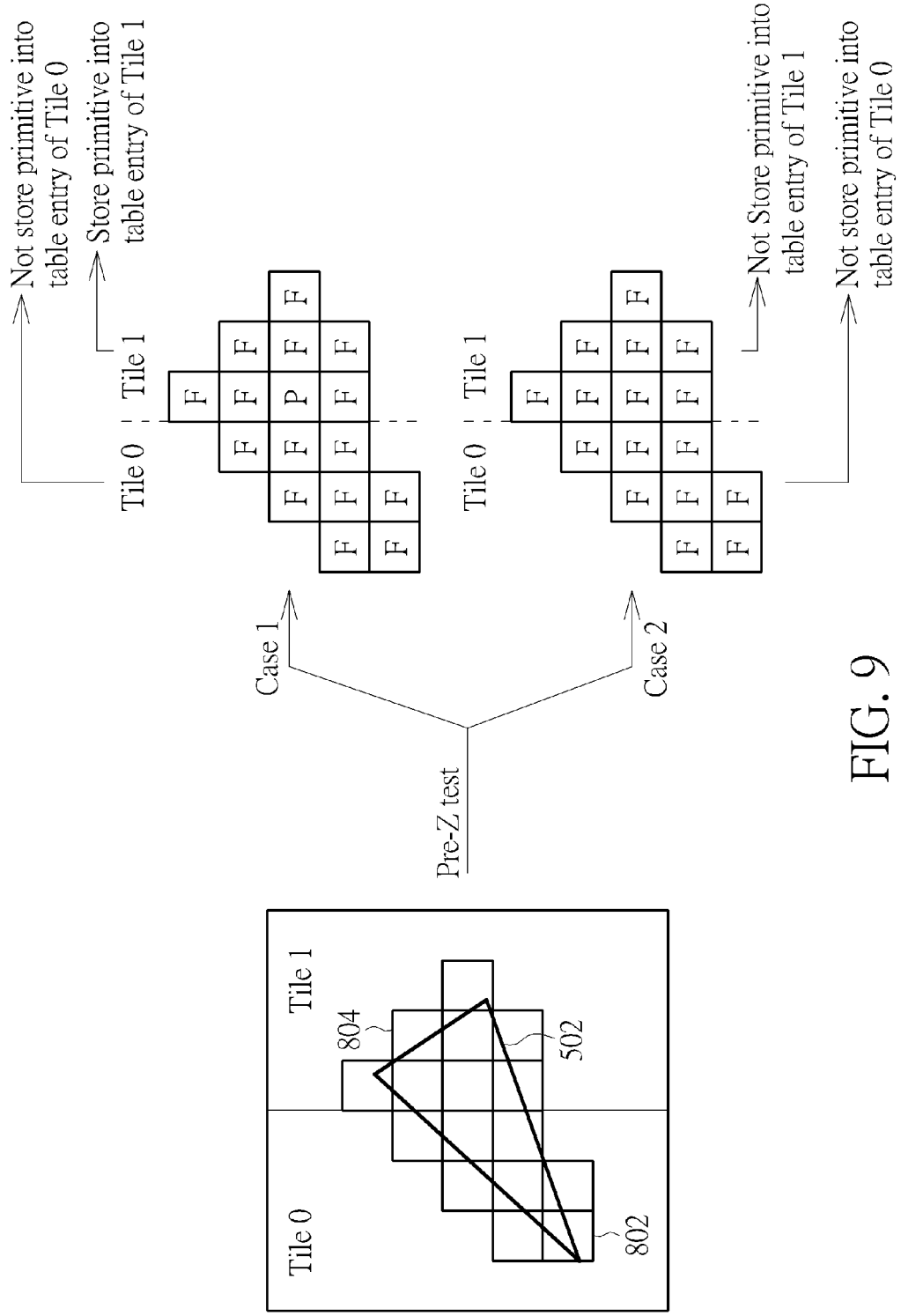
FIG. 9 is a diagram illustrating a second example of selectively removing a primitive based on Pre-Z test of the primitive.

As mentioned above, step 412 may be shared between the Pre-Z occlusion operation and the varying buffering decision making. With regard to the Pre-Z occlusion operation, FIG. 9 is a diagram illustrating a second example of selectively removing a primitive based on Pre-Z test of the primitive. In this example, the valid sub-regions 802 and 804 covered by the primitive 502 are distributed in different tiles (e.g., Tile 0 and Tile 1). Since the valid sub-regions 802 belong to one tile Tile 0 and the valid sub-regions 804 belong to another tile Tile 1, Pre-Z test results of the valid sub-regions 802 are used to determine whether to store primitive information of the primitive 502 into a table entry of the tile table $LTU_T$ in the tile buffer 111, and Pre-Z test results of the valid sub-regions 804 are used to determine whether to store primitive information of the primitive 502 into another table entry of the tile table $LUT_T$ in the tile buffer 111.

In the first case shown in FIG. 9, none of the valid sub-regions 802 passes the Pre-Z test, which means that a portion of the primitive (i.e., a sub-primitive) is behind a geometry and is invisible in the tile Tile 0; and one of the valid sub-regions 804 passes the Pre-Z test, which means that another portion of the primitive (i.e., another sub-primitive) is not behind a geometry and is visible in the tile Tile 1. Hence, the tile scanner 107 is configured not to store primitive information of the primitive 502 into a table entry corresponding to the tile Tile 0 (e.g., table entry 302_1 shown in FIG. 3), and store primitive information of the primitive 502 into a table entry corresponding to the tile Tile 1 (e.g., table entry 302_2 shown in FIG. 3).

In the second case shown in FIG. 9, none of the valid sub-regions 802 passes the Pre-Z test, which means that a portion of the primitive (i.e., a sub-primitive) is behind a geometry and is invisible in the tile Tile 0; and none of the valid sub-regions 804 passes the Pre-Z test, which means that another portion of the primitive (i.e., another sub-primitive) is behind a geometry and is invisible in the tile Tile 1. Hence, the tile scanner 107 is configured not to store primitive information of the primitive 502 into each of table entries corresponding to the tiles Tile 0 and Tile 1 (e.g., table entries 302_1 and 302_2 shown in FIG. 3).

The tile scanner 107 may refer to the primitive size to adaptively switch between two modes of Pre-Z test. More specifically, the primitive size based criterion (i.e., the first criterion) is checked through performing steps 402-408 to determine whether to enable the first mode of Pre-Z test; and when the checking result of the primitive size based criterion indicates that the first mode of Pre-Z test is allowed to be enabled, the second mode of Pre-Z test is enabled, such that one Pre-Z based criterion (i.e., one second criterion) is checked through performing steps 412 and 414. However, this is for illustrative purposes only. In an alternative design, more than one Pre-Z based criterion may be checked for making the final varying buffering decision.

Figure 10:
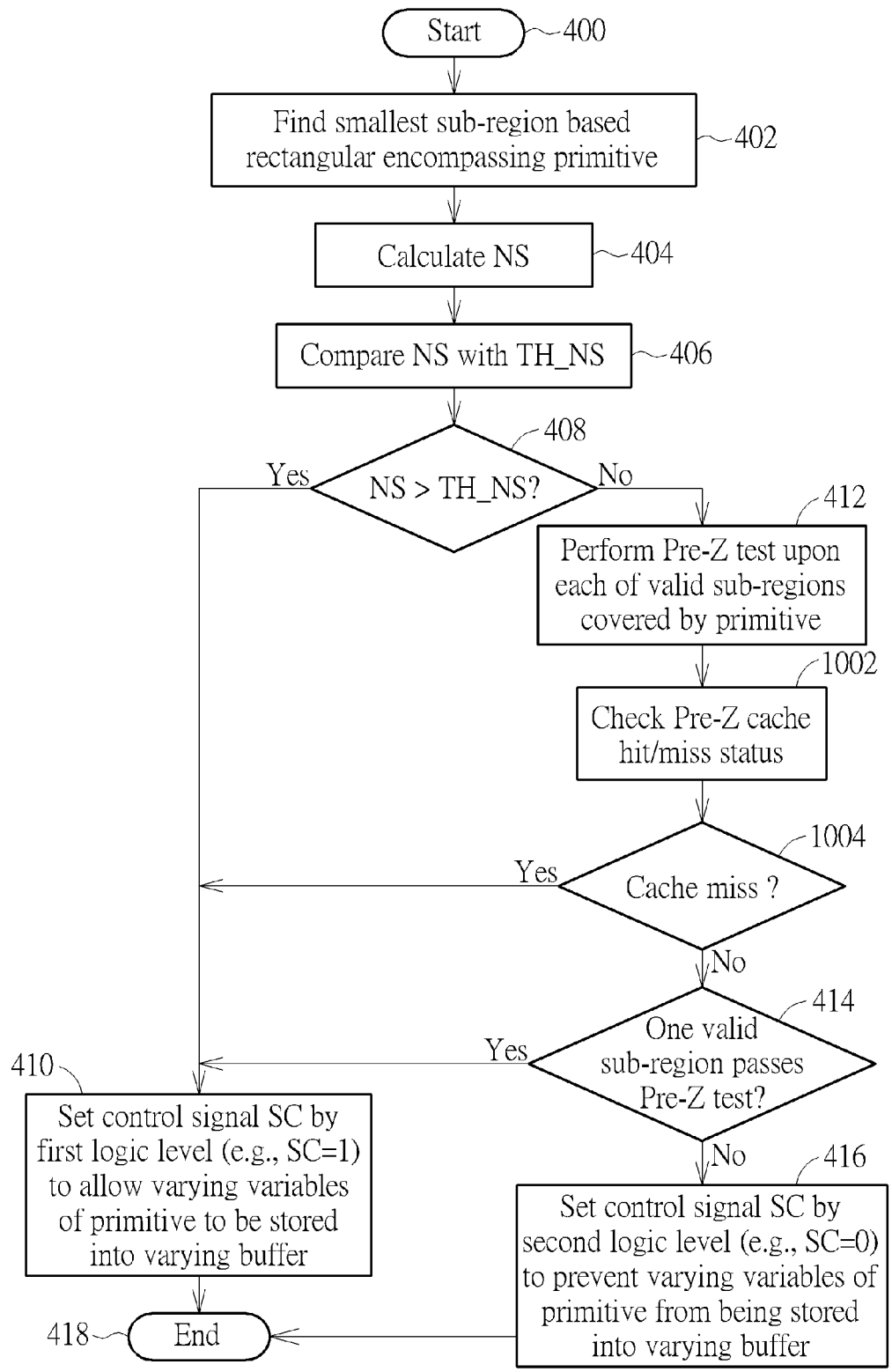
FIG. 10 is a diagram illustrating a method for setting a control signal according to a second embodiment of the present invention.

FIG. 10 is a diagram illustrating a method for setting the control signal SC according to a second embodiment of the present invention, wherein the embodiment here could be implemented with a cache. Provided that the result is substantially the same, the steps are not required to be executed in the exact order shown in FIG. 10. The major difference between the methods shown in FIG. 4 and FIG. 10 is that the method in FIG. 10 further includes following steps.

Step 1002: Check a Pre-Z cache hit/miss status.

Step 1004: Does a cache miss event occur? If yes, go to step 410; otherwise, go to step 416.

As mentioned above, the reference depth information needed by the Pre-Z test preformed upon each valid sub-region is read from the Pre-Z buffer 110 or the cache 108. In this embodiment, the cache 108 is implemented for improving the data access efficiency of the Pre-Z buffer 110. Hence, the cache hit/miss status can be checked to set the control signal SC. In this example, an additional Pre-Z test based criterion is checked, where the additional Pre-Z test based criterion is met when a Pre-Z test encounters a cache miss event.

When a cache miss event occurs during the Pre-Z test of a primitive, the requested reference depth information is not available in the cache 108, and has to be loaded from the Pre-Z buffer 110 to the cache 108 and then transmitted from the cache 108 to the tile scanner 107. In other words, occurrence of the cache miss event means that the Pre-Z test performed upon the primitive would take a long time. Hence, when the checking result of the additional Pre-Z test based criterion indicates that Pre-Z test of one of the valid sub-regions covered by the primitive encounters a cache miss event, the tile scanner 107 is configured to set the control signal SC by the first logic level (e.g., "1") for allowing the primitive varying FIFO buffer 113 to output varying variables of the primitive to the varying buffer 114 (step 410). Since all of the varying variables of the primitive are stored into the varying buffer 114 before completion of the Pre-Z test performed upon the primitive, storing varying variables of the primitive into the varying buffer 114 is not significantly stalled by the long latency caused by the Pre-Z test performed upon the primitive. However, when the checking result of the additional Pre-Z test based criterion indicates that there is no cache miss event occurring during the Pre-Z test of the primitive (i.e., the Pre-Z test of each valid sub-regions covered by the primitive encounters a cache hit event to therefore obtain the requested depth information from the cache 108 directly), the final setting of the control signal SC will depend on Pre-Z test results of the valid sub-regions covered by the primitive (step 414).

Figure 11:
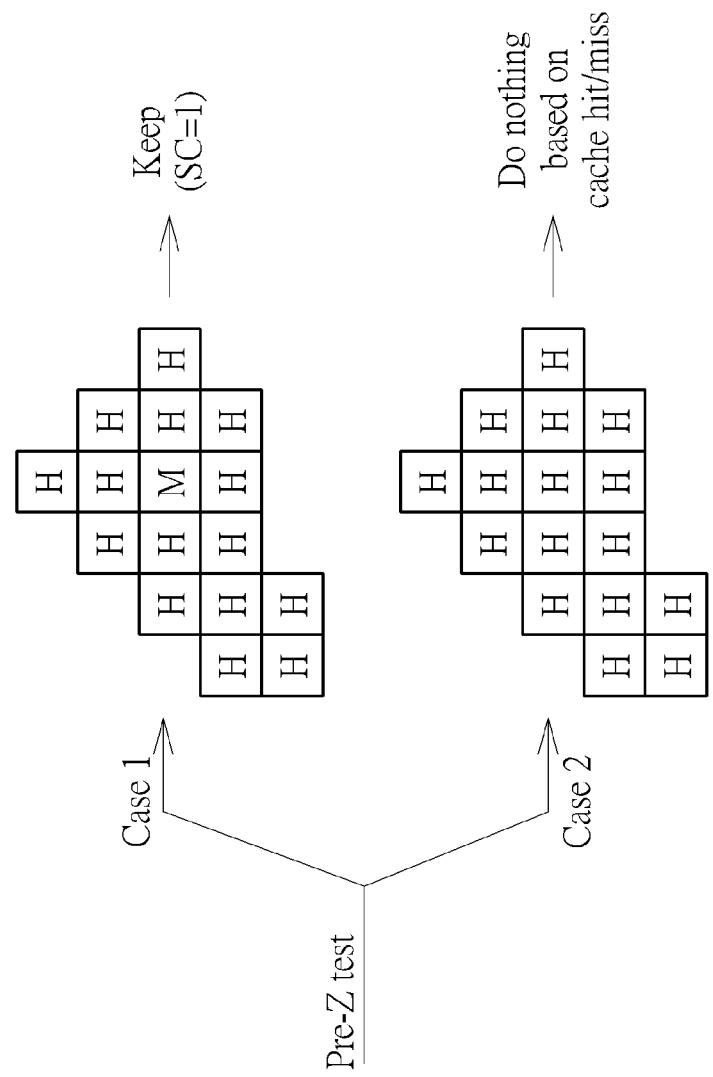
FIG. 11 is a diagram illustrating a first example of making a varying buffering decision based on a Pre-Z cache hit/miss status.
Figure 12:
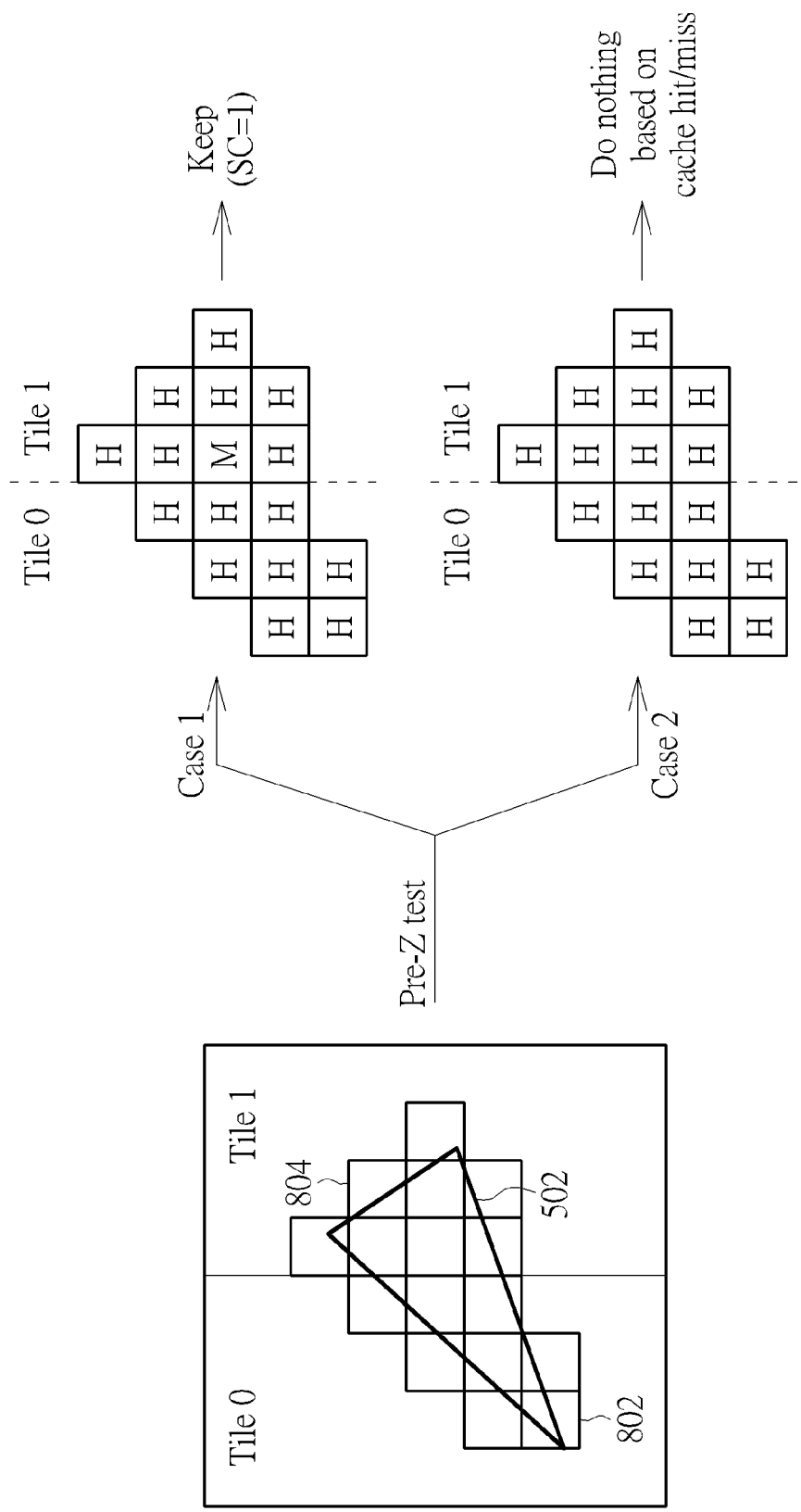
FIG. 12 is a diagram illustrating a second example of making a varying buffering decision based on a Pre-Z cache hit/miss status.

With regard to varying buffering decision making, FIG. 11 is a diagram illustrating a first example of making a varying buffering decision based on a Pre-Z cache hit/miss status, and FIG. 12 is a diagram illustrating a second example of making a varying buffering decision based on a Pre-Z cache hit/miss status. The tile scanner 107 identifies valid sub-regions covered by the primitive 502. In the first example shown in FIG. 11, the valid sub-regions 602 are distributed in the same tile (e.g., Tile 0). In the second example shown in FIG. 12, the valid sub-regions 802 are distributed in one tile (e.g., Tile 0), and the valid sub-regions 804 are distributed in another tile (e.g., Tile 1). In addition, the tile scanner 107 performs a Pre-Z test upon each of the valid sub-regions, where reference depth information needed by the Pre-Z test preformed upon each valid sub-region is read from the cache 108 directly if cache hit (denoted by "H") occurs or read from the Pre-Z buffer 110 through the cache 108 if cache miss (denoted by "M") occurs. When the checking result of the additional Pre-Z test based criterion indicates that the Pre-Z test performed upon one of the valid sub-regions covered by the primitive 502 encounters a cache miss event, the tile scanner 107 is configured to set the control signal SC by the first logic level (e.g., "1") for allowing the primitive varying FIFO buffer 113 to output varying variables of the primitive 502 to the varying buffer 114 (step 410), as illustrated by the first case in FIG. 11 and the first case in FIG. 12. However, when none of the Pre-Z tests performed upon the valid sub-regions covered by the primitive 502 encounters a cache miss event, the control signal SC is not set by the checking result of the additional Pre-Z test based criterion, as illustrated by the second case in FIG. 11 and the second case in FIG. 12.

For better understanding of technical features of the present invention, several exemplary cases of the Pre-Z test flow performed under a condition that a size of a primitive fails to meet a primitive size based criterion are described as below.

Figure 13:
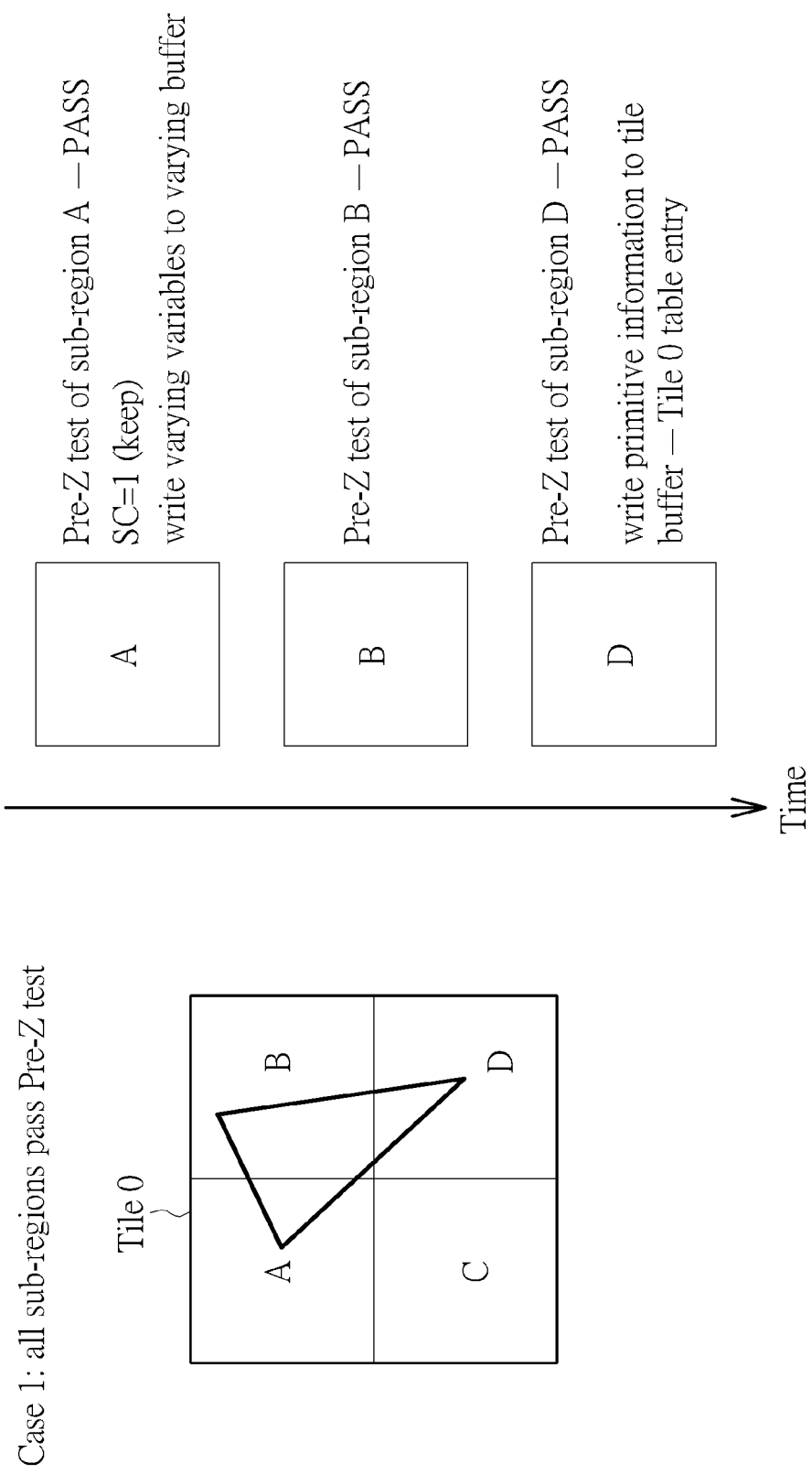
FIG. 13 is a diagram illustrating a first exemplary case of the Pre-Z test flow performed under a condition that a size of a primitive fails to meet a primitive size based criterion.

FIG. 13 is a diagram illustrating a first exemplary case of the Pre-Z test flow performed under a condition that a size of a primitive fails to meet a primitive size based criterion. One tile Tile 0 is divided into four sub-regions (sub-tiles) A, B, C, and D. In addition, a primitive is fully within the tile Tile 0, and the sub-regions A, B, and D are covered by the primitive. Hence, the Pre-Z test performed upon the primitive is applied to the sub-regions A, B, and D, sequentially. In the beginning, the Pre-Z occlusion operation checks the first valid sub-region (i.e., sub-region A). In this case, the sub-region A passes the Pre-Z test. At this moment, the varying buffering decision making operation sets the control signal SC by the first logic value (e.g., SC=1), such that all varying variables of the primitive are stored into a varying buffer. The Pre-Z occlusion operation keeps checking the next valid sub-region (i.e., sub-region B). In this case, the sub-region B also passes the Pre-Z test. The Pre-Z occlusion operation keeps checking the next valid sub-region (i.e., sub-region D). In this case, the sub-region D also passes the Pre-Z test. Since all of the valid sub-regions covered by the primitive have been checked and at least one of the valid sub-regions is found passing the Pre-Z test, the Pre-Z occlusion operation writes the primitive information of the primitive into a table entry of a tile table in a tile buffer, where the table entry corresponds to the tile Tile 0.

Figure 14:
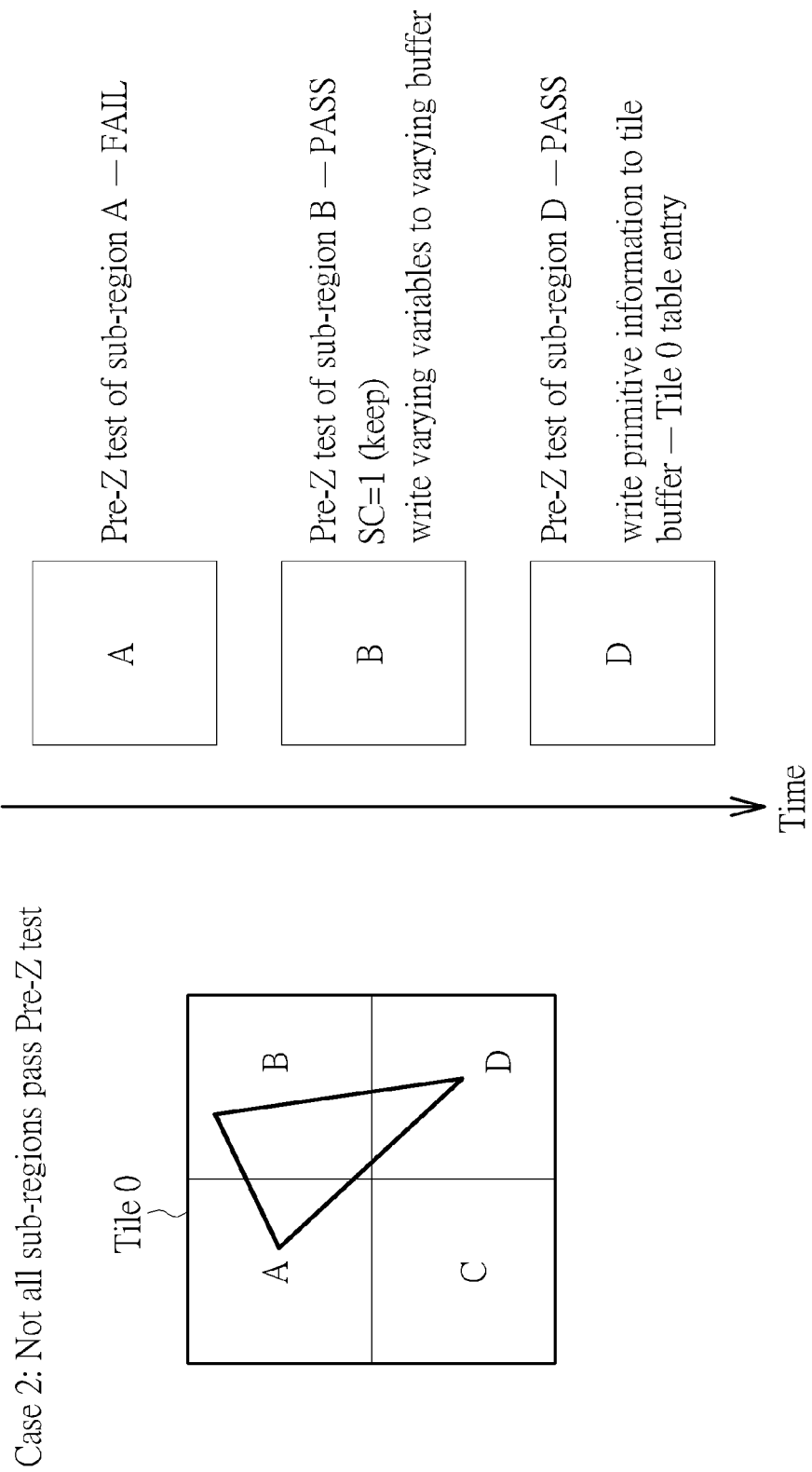
FIG. 14 is a diagram illustrating a second exemplary case of the Pre-Z test flow performed under a condition that a size of a primitive fails to meet a primitive size based criterion.

FIG. 14 is a diagram illustrating a second exemplary case of the Pre-Z test flow performed under a condition that a size of a primitive fails to meet a primitive size based criterion. One tile Tile 0 is divided into four sub-regions (sub-tiles) A, B, C, and D. In addition, a primitive is fully within the tile Tile 0, and the sub-regions A, B, and D are covered by the primitive. Hence, the Pre-Z test performed upon the primitive is applied to the sub-regions A, B, and D, sequentially. In the beginning, the Pre-Z occlusion operation checks the first valid sub-region (i.e., sub-region A). In this case, the sub-region A fails to pass the Pre-Z test. At this moment, the varying buffering decision making operation is unable to confirm the setting of the control signal SC. The Pre-Z occlusion operation keeps checking the next valid sub-region (i.e., sub-region B). In this case, the sub-region B passes the Pre-Z test. At this moment, the varying buffering decision making operation sets the control signal SC by the first logic value (e.g., SC=1), such that all varying variables of the primitive are stored into a varying buffer. The Pre-Z occlusion operation keeps checking the next valid sub-region (i.e., sub-region D). In this case, the sub-region D also passes the Pre-Z test. Since all of the valid sub-regions covered by the primitive have been checked and at least one of the valid sub-regions is found passing the Pre-Z test, the Pre-Z occlusion operation writes the primitive information of the primitive into a table entry of a tile table in a tile buffer, where the table entry corresponds to the tile Tile 0.

Figure 15:
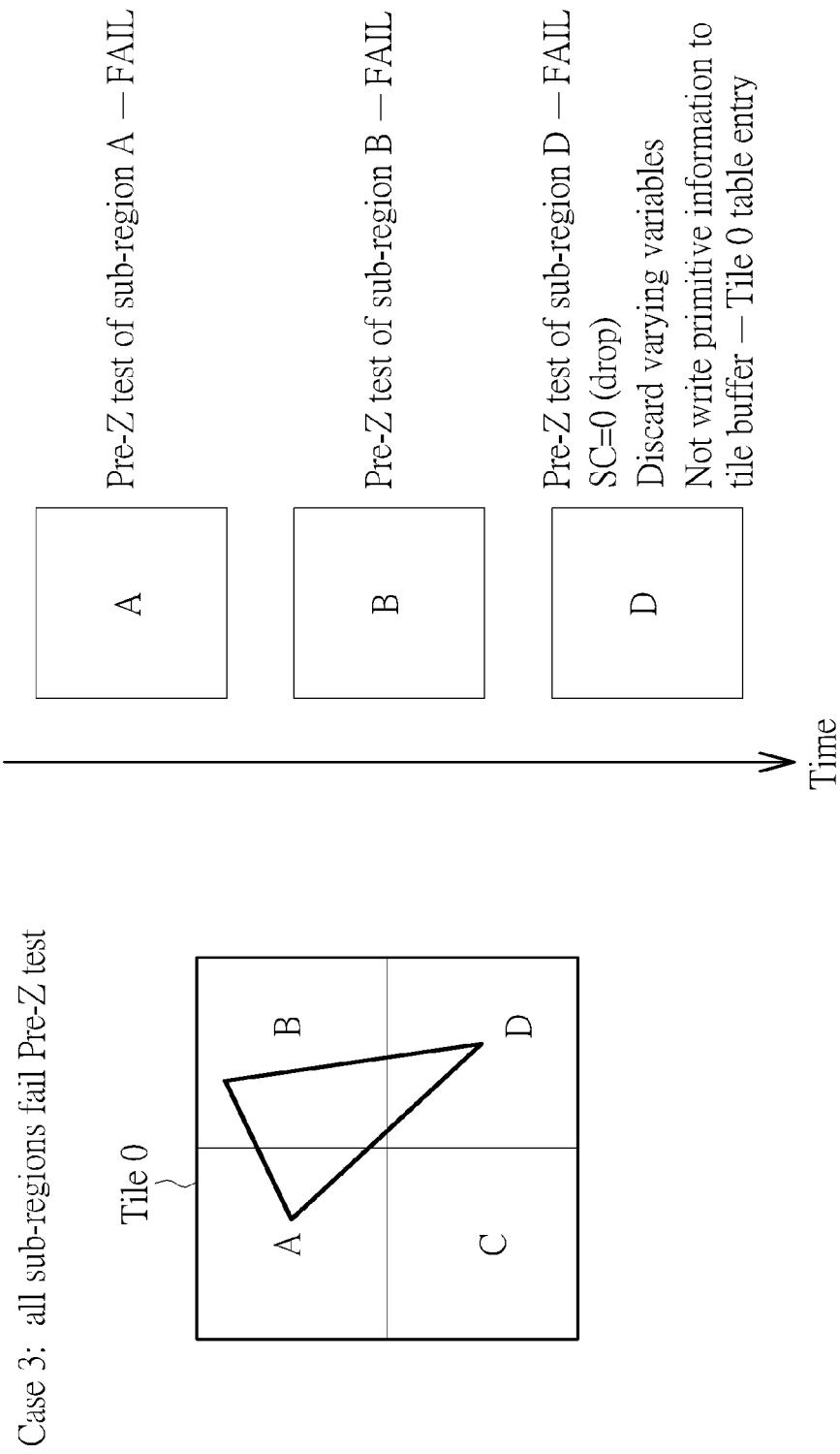
FIG. 15 is a diagram illustrating a third exemplary case of the Pre-Z test flow performed under a condition that a size of a primitive fails to meet a primitive size based criterion.

FIG. 15 is a diagram illustrating a third exemplary case of the Pre-Z test flow performed under a condition that a size of a primitive fails to meet a primitive size based criterion. One tile Tile 0 is divided into four sub-regions (sub-tiles) A, B, C, and D. In addition, a primitive is fully within the tile Tile 0, and the sub-regions A, B, and D are covered by the primitive. Hence, the Pre-Z test performed upon the primitive is applied to the sub-regions A, B, and D, sequentially. In the beginning, the Pre-Z occlusion operation checks the first valid sub-region (i.e., sub-region A). In this case, the sub-region A fails to pass the Pre-Z test. At this moment, the varying buffering decision making operation is unable to confirm the setting of the control signal SC. The Pre-Z occlusion operation keeps checking the next valid sub-region (i.e., sub-region B). In this case, the sub-region B also fails to pass the Pre-Z test. At this moment, the varying buffering decision making operation is still unable to confirm the setting of the control signal SC. The Pre-Z occlusion operation keeps checking the next valid sub-region (i.e., sub-region D). In this case, the sub-region D also fails to pass the Pre-Z test. Since all of the valid sub-regions covered by the primitive have been checked and none of the valid sub-regions is found passing the Pre-Z test, the varying buffering decision making operation sets the control signal SC by the second logic value (e.g., SC=0), such that all varying variables of the primitive are discarded without being stored into a varying buffer. Further, the Pre-Z occlusion operation does not write the primitive information of the primitive into a table entry of a tile table in a tile buffer, where the table entry corresponds to the tile Tile 0.

Figure 16:
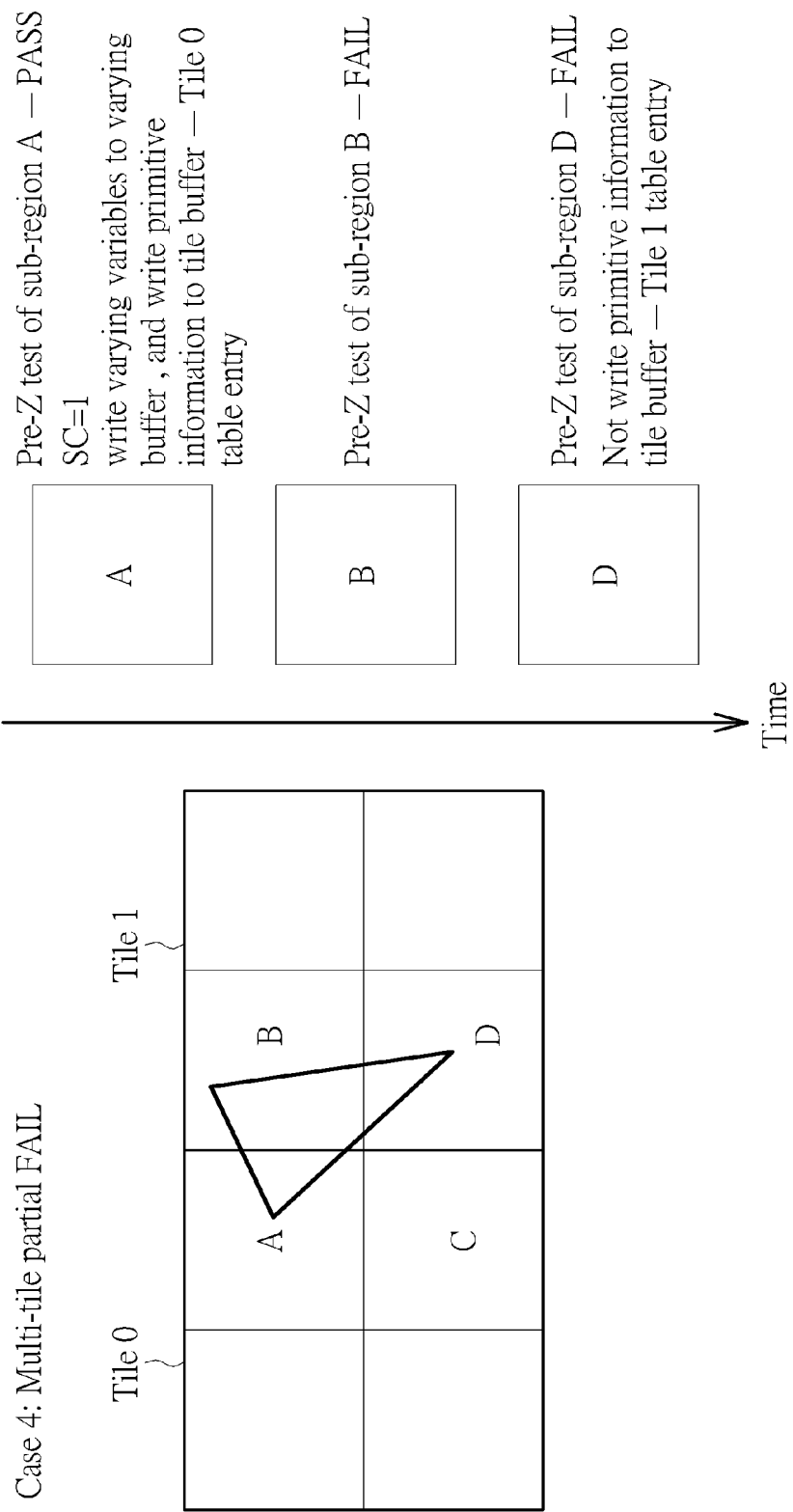
FIG. 16 is a diagram illustrating a fourth exemplary case of the Pre-Z test flow performed under a condition that a size of a primitive fails to meet a primitive size based criterion.

FIG. 16 is a diagram illustrating a fourth exemplary case of the Pre-Z test flow performed under a condition that a size of a primitive fails to meet a primitive size based criterion. One tile Tile 0 is divided into four sub-regions, including sub-regions A and C shown in FIG. 16; and the adjacent tile Tile 1 is also divided into four sub-regions, including sub-regions B and D shown in FIG. 16. The Pre-Z test is applied to the tiles Tile 0 and Tile 1, sequentially. In addition, a primitive is partially within one tile Tile 0 and partially within another other tile Tile 1, where the sub-region A in the tile Tile 0 is covered by the primitive, and the sub-regions B and D in the tile Tile 1 are covered by the primitive. Since the Pre-Z test is applied to tiles Tile 0 and Tile 1 one by one, the Pre-Z test performed upon the primitive is applied to the sub-regions A, B, and D, sequentially. In the beginning, the Pre-Z occlusion operation checks the first valid sub-region (i.e., sub-region A). In this case, the sub-region A passes the Pre-Z test. At this moment, the varying buffering decision making operation sets the control signal SC by the first logic value (e.g., SC=1), such that all varying variables of the primitive are stored into a varying buffer. In addition, since the single valid sub-region in the tile Tile 0 that is covered by the primitive (i.e., sub-region A) has been checked and the checked single valid sub-region in the tile Tile 0 (i.e., sub-region A) passes the Pre-Z test, the Pre-Z occlusion operation writes the primitive information of the primitive into a table entry of a tile table in a tile buffer, where the table entry corresponds to the tile Tile 0.

The Pre-Z occlusion operation keeps checking a valid sub-region in the next tile Tile 1 (i.e., sub-region B). In this case, the sub-region B fails to pass the Pre-Z test. The Pre-Z occlusion operation keeps checking the next valid sub-region (i.e., sub-region D). In this case, the sub-region D also fails to pass the Pre-Z test. Since all valid sub-regions in the tile Tile 1 that are covered by the primitive (i.e., sub-regions B and D) have been checked and none of the checked valid sub-regions in the tile Tile 1 (i.e., sub-regions B and D) passes the Pre-Z test, the Pre-Z occlusion operation does not write the primitive information of the primitive into another table entry of the tile table in the tile buffer, where the another table entry corresponds to the tile Tile 1.

Figure 17:
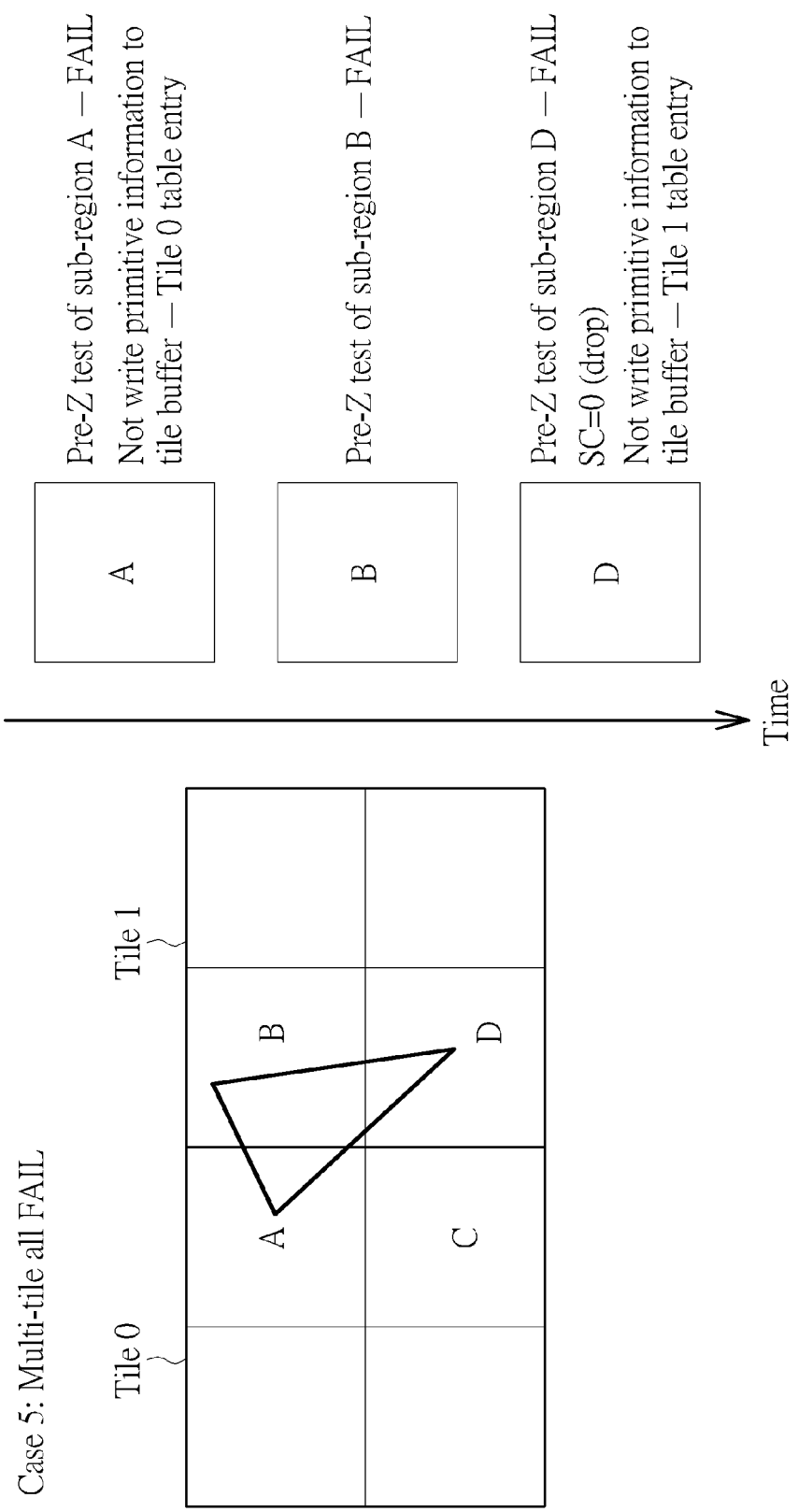
FIG. 17 is a diagram illustrating a fifth exemplary case of the Pre-Z test flow performed under a condition that a size of a primitive fails to meet a primitive size based criterion.

FIG. 17 is a diagram illustrating a fifth exemplary case of the Pre-Z test flow performed under a condition that a size of a primitive fails to meet a primitive size based criterion. One tile Tile 0 is divided into four sub-regions, including sub-regions A and C shown in FIG. 17; and the adjacent tile Tile 1 is also divided into four sub-regions, including sub-regions B and D shown in FIG. 17. The Pre-Z test is applied to the tiles Tile 0 and Tile 1, sequentially. In addition, a primitive is partially within one tile Tile 0 and partially within another tile Tile 1, where the sub-region A in the tile Tile 0 is covered by the primitive, and the sub-regions B and D in the tile Tile 1 are covered by the primitive. Since the Pre-Z test is applied to tiles Tile 0 and Tile 1 one by one, the Pre-Z test performed upon the primitive is applied to the sub-regions A, B, and D, sequentially. In the beginning, the Pre-Z occlusion operation checks the first valid sub-region (i.e., sub-region A). In this case, the sub-region A fails to pass the Pre-Z test. Since the single valid sub-region in the tile Tile 0 that is covered by the primitive (i.e., sub-region A) has been checked and the checked single valid sub-region in the tile Tile 0 (i.e., sub-region A) fails to pass the Pre-Z test, the Pre-Z occlusion operation does not write the primitive information of the primitive into a table entry of a tile table in a tile buffer, where the table entry corresponds to the tile Tile 0.

The Pre-Z occlusion operation keeps checking a valid sub-region in the next tile Tile 1 (i.e., sub-region B). In this case, the sub-region B also fails to pass the Pre-Z test. The Pre-Z occlusion operation keeps checking the next valid sub-region (i.e., sub-region D). In this case, the sub-region D also fails to pass the Pre-Z test. Since all valid sub-regions covered by the primitive (i.e., sub-regions A, B and D) have been checked and none of the checked valid sub-regions passes the Pre-Z test, the varying buffering decision making operation sets the control signal SC by the second logic value (e.g., SC=0), such that all varying variables of the primitive are discarded without being stored into a varying buffer. Further, since all valid sub-regions in the tile Tile 1 that are covered by the primitive (i.e., sub-regions B and D) have been checked and none of the checked valid sub-regions in the tile Tile 1 (i.e., sub-regions B and D) passes the Pre-Z test, the Pre-Z occlusion operation does not write the primitive information of the primitive into another table entry of the tile table in the tile buffer, where the another table entry corresponds to the tile Tile 1.

Figure 18:
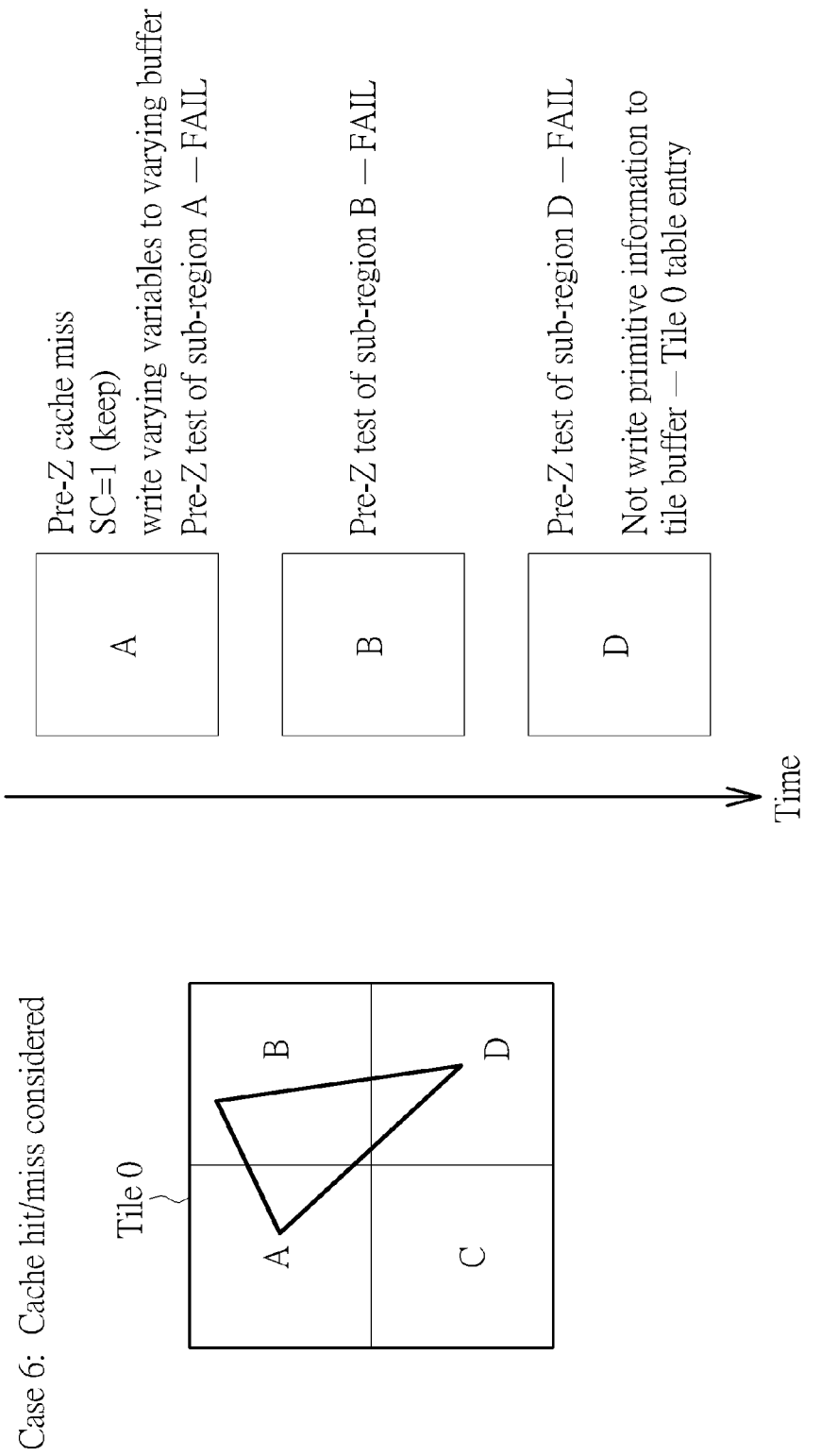
FIG. 18 is a diagram illustrating a sixth exemplary case of the Pre-Z test flow performed under a condition that a size of a primitive fails to meet a primitive size based criterion.

FIG. 18 is a diagram illustrating a sixth exemplary case of the Pre-Z test flow performed under a condition that a size of a primitive fails to meet a primitive size based criterion. One tile Tile 0 is divided into four sub-regions (sub-tiles) A, B, C, and D. In addition, a primitive is fully within the tile Tile 0, and the sub-regions A, B, and D are covered by the primitive. Hence, the Pre-Z test performed upon the primitive is applied to the sub-regions A, B, and D, sequentially. In the beginning, the Pre-Z occlusion operation checks the first valid sub-region (i.e., sub-region A). In this case, the Pre-Z test of the sub-region A encounters a cache miss event. Hence, the varying buffering decision making operation sets the control signal SC by the first logic value (e.g., SC=1), such that all varying variables of the primitive are stored into a varying buffer. In addition, the sub-region A fails to pass the Pre-Z test. The Pre-Z occlusion operation keeps checking the next valid sub-region (i.e., sub-region B). In this case, the sub-region B also fails to pass the Pre-Z test. The Pre-Z occlusion operation keeps checking the next valid sub-region (i.e., sub-region D). In this case, the sub-region D also fails to pass the Pre-Z test. Since all of the valid sub-regions covered by the primitive have been checked and none of the valid sub-regions is found passing the Pre-Z test, the Pre-Z occlusion operation does not write the primitive information of the primitive into a table entry of a tile table in a tile buffer, where the table entry corresponds to the tile Tile 0.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A graphics processing system comprising:
a decision logic, configured to set a control signal by checking at least one criterion, wherein the at least one criterion includes a first criterion, a screen space is divided into a plurality of sub-regions; the decision logic generates a checking result of the first criterion by comparing a number of valid sub-regions covered by a smallest sub-region based rectangular encompassing a primitive with a predetermined threshold, and sets the control signal according to the checking result of the first criterion that indicates the number of valid sub-regions covered by the smallest sub-region based rectangular is larger than the predetermined threshold; and
a varying buffer control circuit, configured to refer to the control signal to determine whether to store varying variables of the primitive into a varying buffer.

2. The graphics processing system of claim 1, wherein the graphics processing system is a tile-based rendering (TBR) system; and when the checking result of the first criterion indicates that the number of valid sub-regions covered by the smallest sub-region based rectangular is larger than the predetermined threshold, the decision logic sets the control signal for allowing the varying buffer control circuit to store the varying variables of the primitive into the varying buffer.

3. The graphics processing system of claim 1, wherein the graphics processing system is a tile-based rendering (TBR) system; a screen space is divided into a plurality of tiles each having a plurality of sub-regions; the decision logic is further configured to perform a pre-depth (Pre-Z) test upon each of valid sub-regions covered by the primitive; the valid sub-regions are all included in a specific tile; and when one of the valid sub-regions passes the Pre-Z test, the decision logic is further configured to store primitive information of the primitive into a specific table entry of a tile table in a tile buffer, where the specific table entry corresponds to the specific tile.

4. The graphics processing system of claim 1, wherein the graphics processing system is a tile-based rendering (TBR) system; a screen space is divided into a plurality of tiles each having a plurality of sub-regions; the decision logic is further configured to perform a pre-depth (Pre-Z) test upon each of valid sub-regions covered by the primitive; the valid sub-regions are distributed in different tiles; and when one of a portion of the valid sub-regions passes the Pre-Z test, the decision logic is further configured to store primitive information of the primitive into a specific table entry of a tile table in a tile buffer, where the specific table entry corresponds to a specific tile having the portion of the valid sub-regions included therein.

5. The graphics processing system of claim 1, wherein the decision logic is further configured to perform a pre-depth (Pre-Z) test upon the primitive; and the at least one criterion further includes a second criterion, and a checking result of the second criterion depends on the Pre-Z test performed upon the primitive.

6. The graphics processing system of claim 5, wherein the decision logic checks the second criterion when determining that storing the varying variables of the primitive into the varying buffer is not allowed by the checking result of the first criterion.

7. The graphics processing system of claim 5, wherein a screen space is divided into a plurality of sub-regions; the Pre-Z test is performed upon each of valid sub-regions covered by the primitive; and when the checking result of the second criterion indicates that one of the valid sub-regions passes the Pre-Z test, the decision logic sets the control signal for allowing the varying buffer control circuit to store the varying variables of the primitive into the varying buffer.

8. The graphics processing system of claim 7, wherein the graphics processing system is a tile-based rendering (TBR) system; the screen space is divided into a plurality of tiles each having more than one sub-region; the valid sub-regions are all included in a specific tile; and the decision logic is further configured to store primitive information of the primitive into a specific table entry of a tile table in a tile buffer, where the specific table entry corresponds to the specific tile.

9. The graphics processing system of claim 7, wherein the graphics processing system is a tile-based rendering (TBR) system; the screen space is divided into a plurality of tiles each having more than one sub-region; the valid sub-regions are distributed in different tiles; and when one of a portion of the valid sub-regions passes the Pre-Z test, the decision logic is further configured to store primitive information of the primitive into a specific table entry of a tile table in a tile buffer, where the specific table entry corresponds to a specific tile having the portion of the valid sub-regions included therein.

10. A graphics processing system comprising:
a decision logic, configured to set a control signal by checking at least one criterion, and further configured to perform a pre-depth (Pre-Z) test upon a primitive, wherein a checking result of the at least one criterion depends on the Pre-Z test performed upon the primitive; and
a varying buffer control circuit, configured to refer to the control signal to determine whether to store varying variables of the primitive into a varying buffer;
wherein a screen space is divided into a plurality of sub-regions; the Pre-Z test is performed upon each of valid sub-regions covered by the primitive; and when the checking result of the at least one criterion indicates that the Pre-Z test performed upon one of the valid sub-regions encounters a cache miss event, the decision logic sets the control signal for allowing the varying buffer control circuit to store the varying variables of the primitive into the varying buffer.

11. The graphics processing system of claim 10, wherein the valid sub-regions are all included in a specific tile; and when one of the valid sub-regions passes the Pre-Z test, the decision logic is further configured to store primitive information of the primitive into a specific table entry of a tile table in a tile buffer, where the specific table entry corresponds to the specific tile.

12. The graphics processing system of claim 10, wherein the valid sub-regions are distributed in different tiles; and when one of a portion of the valid sub-regions passes the Pre-Z test, the decision logic is further configured to store primitive information of the primitive into a specific table entry of a tile table in a tile buffer, where the specific table entry corresponds to a specific tile having the portion of the valid sub-regions included therein.

13. A graphics processing method comprising:
utilizing a decision logic for setting a control signal by checking at least one criterion, wherein the at least one criterion includes a first criterion, a screen space is divided into a plurality of sub-regions, checking the at least one criterion comprises:
generating a checking result of the first criterion by comparing a number of valid sub-regions covered by a smallest sub-region based rectangular encompassing a primitive with a predetermined threshold; and
setting the control signal comprises:
setting the control signal according to the checking result of the first criterion that indicates the number of valid sub-regions covered by the smallest sub-region based rectangular is larger than the predetermined threshold; and
referring to the control signal to determine whether to store varying variables of the primitive into a varying buffer.

14. The graphics processing method of claim 13, wherein the graphics processing method employs tile-based rendering; and setting the control signal according to the checking result of the first criterion comprises:
when the checking result of the first criterion indicates that the number of valid sub-regions covered by the smallest sub-region based rectangular is larger than the predetermined threshold, setting the control signal for allowing the varying variables of the primitive to be stored into the varying buffer.

15. The graphics processing method of claim 13, wherein the graphics processing method employs tile-based rendering (TBR); a screen space is divided into a plurality of tiles each having a plurality of sub-regions; and the graphics processing method further comprises:
performing a pre-depth (Pre-Z) test upon each of valid sub-regions covered by the primitive, wherein the valid sub-regions are all included in a specific tile; and
when one of the valid sub-regions passes the Pre-Z test, storing primitive information of the primitive into a specific table entry of a tile table in a tile buffer, wherein the specific table entry corresponds to the specific tile.

16. The graphics processing method of claim 13, wherein the graphics processing method employs tile-based rendering (TBR); a screen space is divided into a plurality of tiles each having a plurality of sub-regions; and the graphics processing method further comprises:
performing a pre-depth (Pre-Z) test upon each of valid sub-regions covered by the primitive, wherein the valid sub-regions are distributed in different tiles; and
when one of a portion of the valid sub-regions passes the Pre-Z test, storing primitive information of the primitive into a specific table entry of a tile table in a tile buffer, wherein the specific table entry corresponds to a specific tile having the portion of the valid sub-regions included therein.

17. The graphics processing method of claim 13, further comprising:
performing a pre-depth (Pre-Z) test upon the primitive; wherein the at least one criterion further includes a second criterion, and a checking result of the second criterion depends on the Pre-Z test performed upon the primitive.

18. The graphics processing method of claim 17, wherein checking the at least one criterion comprises:
checking the second criterion when determining that storing the varying variables of the primitive into the varying buffer is not allowed by the checking result of the first criterion.

19. The graphics processing method of claim 17, wherein a screen space is divided into a plurality of sub-regions; the Pre-Z test is performed upon each of valid sub-regions covered by the primitive; and setting the control signal comprises:
when the checking result of the second criterion indicates that one of the valid sub-regions passes the Pre-Z test, setting the control signal for allowing the varying variables of the primitive to be stored into the varying buffer.

20. The graphics processing method of claim 19, wherein the graphics processing method employs tile-based rendering (TBR); the screen space is divided into a plurality of tiles each having more than one sub-region; the valid sub-regions are all included in a specific tile; and the graphics processing method further comprises:
storing primitive information of the primitive into a specific table entry of a tile table in a tile buffer, where the specific table entry corresponds to the specific tile.

21. The graphics processing method of claim 19, wherein the graphics processing method employs tile-based rendering (TBR); the screen space is divided into a plurality of tiles each having more than one sub-region; the valid sub-regions are distributed in different tiles; and the graphics processing method further comprises:
when one of a portion of the valid sub-regions passes the Pre-Z test, storing primitive information of the primitive into a specific table entry of a tile table in a tile buffer, where the specific table entry corresponds to a specific tile having the portion of the valid sub-regions included therein.

22. A graphics processing method comprising:
utilizing a decision logic for setting a control signal by checking at least one criterion and for performing a pre-depth (Pre-Z) test upon a primitive, wherein a checking result of the at least one criterion depends on the Pre-Z test performed upon the primitive; and
referring to the control signal to determine whether to store varying variables of the primitive into a varying buffer;
wherein a screen space is divided into a plurality of sub-regions; the Pre-Z test is performed upon each of valid sub-regions covered by the primitive; and setting the control signal comprises:
when the checking result of the at least one criterion indicates that the Pre-Z test performed upon one of the valid sub-regions encounters a cache miss event, setting the control signal for allowing the varying variables of the primitive to be stored into the varying buffer.

23. The graphics processing method of claim 22, wherein the valid sub-regions are all included in a specific tile; and the graphics processing method further comprises:
when one of the valid sub-regions passes the Pre-Z test, storing primitive information of the primitive into a specific table entry of a tile table in a tile buffer, where the specific table entry corresponds to the specific tile.

24. The graphics processing method of claim 22, wherein the valid sub-regions are distributed in different tiles; and the graphics processing method further comprises:
  when one of a portion of the valid sub-regions passes the Pre-Z test, storing primitive information of the primitive into a specific table entry of a tile table in a tile buffer, where the specific table entry corresponds to a specific tile having the portion of the valid sub-regions included therein.

* * * * *